US012589829B2

(12) United States Patent       (10) Patent No.: US 12,589,829 B2
    Kawakami                         (45) Date of Patent: Mar. 31, 2026

(54) MOTOR UNIT AND ELECTRIC BICYCLE

(71) Applicant: Panasonic Intellectual Property Management Co., Ltd., Osaka (JP)

(72) Inventor: Masafumi Kawakami, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1079 days.

(21) Appl. No.: 17/790,533

(22) PCT Filed: Mar. 13, 2019

(86) PCT No.: PCT/JP2019/010200
    § 371 (c)(1),
    (2) Date: Jul. 1, 2022

(87) PCT Pub. No.: WO2019/176999
    PCT Pub. Date: Sep. 19, 2019

(65) Prior Publication Data
    US 2023/0043341 A1      Feb. 9, 2023

(30) Foreign Application Priority Data

Mar. 13, 2018    (JP) ................................. 2018-046036

(51) Int. Cl.
    *B62M 6/55*      (2010.01)
    *H02K 7/08*      (2006.01)
    (Continued)

(52) U.S. Cl.
    CPC .............. *B62M 6/55* (2013.01); *H02K 7/083* (2013.01); *H02K 7/108* (2013.01); *H02K 7/116* (2013.01);
    (Continued)

(58) Field of Classification Search
    CPC ......... B62M 6/55; H02K 11/24; H02K 11/33; H02K 7/083; H02K 7/108; H02K 7/116; H02K 2211/03
    (Continued)

(56) References Cited

U.S. PATENT DOCUMENTS

2013/0162112 A1*   6/2013  Loefel .................. B62M 11/145
                                                           310/68 B
2015/0336631 A1*  11/2015  Nishikawa ............... B62M 6/55
                                                           74/670
                        (Continued)

FOREIGN PATENT DOCUMENTS

CN       103963913  A  *  8/2014
DE     102011087784  A1     6/2013
                (Continued)

OTHER PUBLICATIONS

International Search Report for corresponding Application No. PCT/JP2019/010200, mailed Jun. 18, 2019.
                (Continued)

*Primary Examiner* — Valentin Neacsu
*Assistant Examiner* — Mohamed M Medani
(74) *Attorney, Agent, or Firm* — Renner, Otto, Boisselle & Sklar, LLP

(57)              ABSTRACT

A motor unit includes a case, a motor, an input shaft, an input body, an output body, and a speed reducer mechanism. The input shaft penetrates through the case in an axial direction and is arranged to be rotatable. The input body is disposed along an outer peripheral surface of the input shaft and rotates along with the input shaft. The output body is arranged along the outer peripheral surface of the input shaft to be rotatable and receives rotational force from the input body. The case includes a first bearing, a second bearing, and a third bearing. The first bearing is located at one end in an (Continued)

axial direction and supports a rotary shaft unit including the input shaft, the input body, and the output body. The second bearing is located at the other end in the axial direction and supports the rotary shaft unit. The third bearing is located between the first bearing and the second bearing in the axial direction and supports at least one of the input body or the output body.

18 Claims, 18 Drawing Sheets

(51) Int. Cl.
　　*H02K 7/108*　　　(2006.01)
　　*H02K 7/116*　　　(2006.01)
　　*H02K 11/24*　　　(2016.01)
　　*H02K 11/33*　　　(2016.01)
(52) U.S. Cl.
　　CPC ............. *H02K 11/24* (2016.01); *H02K 11/33* (2016.01); *H02K 2211/03* (2013.01)
(58) Field of Classification Search
　　USPC ...................................................... 180/206.4
　　See application file for complete search history.

(56) References Cited

U.S. PATENT DOCUMENTS

| 2016/0107720 A1* | 4/2016 | Xu | ........................... B62M 6/50 |
| | | | 475/4 |
| 2016/0107721 A1* | 4/2016 | Urabe | ..................... B62M 6/55 |
| | | | 475/4 |
| 2016/0280321 A1* | 9/2016 | Yamamoto | .............. F16H 3/083 |
| 2016/0280328 A1* | 9/2016 | Yamamoto | ............... B62M 6/55 |
| 2017/0137088 A1* | 5/2017 | Watarai | .................. B62M 11/02 |
| 2017/0274963 A1* | 9/2017 | Yamamoto | ............... B62M 6/90 |
| 2017/0356508 A1 | 12/2017 | Usami | |
| 2019/0047401 A1* | 2/2019 | Tamura | ................. F16C 19/184 |

FOREIGN PATENT DOCUMENTS

| EP | 2743169 A1 | 6/2014 | |
| EP | 2998211 A1 | 3/2016 | |
| EP | 3323702 A | 5/2018 | |
| JP | 2001063678 A * | 3/2001 | ............. B60L 50/53 |
| JP | 2003-341585 A | 12/2003 | |
| JP | 2013-208920 A | 10/2013 | |
| JP | 2017-019445 A | 1/2017 | |
| JP | 2017-218104 A | 12/2017 | |
| WO | 2014/097985 A1 | 6/2014 | |
| WO | 2014/184826 A1 | 11/2014 | |

OTHER PUBLICATIONS

Written Opinion for corresponding Application No. PCT/JP2019/010200, mailed Jun. 18, 2019.

Japanese Office Action dated May 16, 2023 in corresponding Japanese Patent Application 2022-206500, with English Translation.

* cited by examiner

*FIG. 10 B*          *FIG. 10 A*
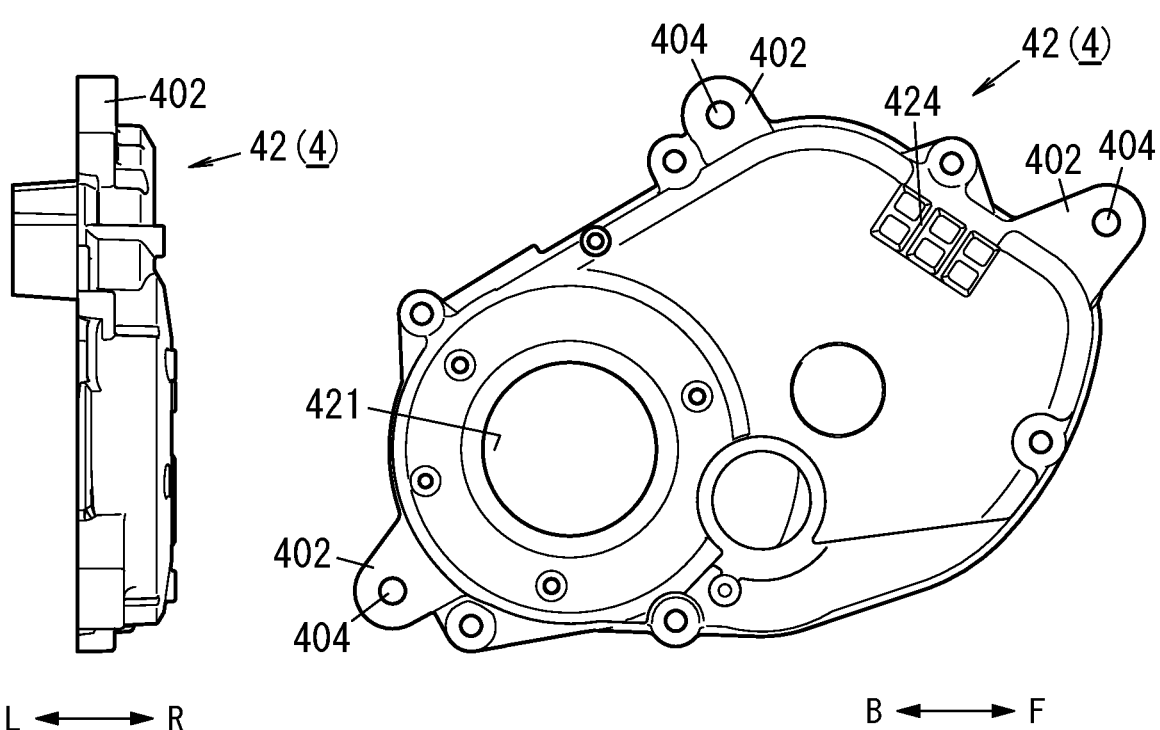
L ←→ R
B ←→ F
*FIG. 10 C*
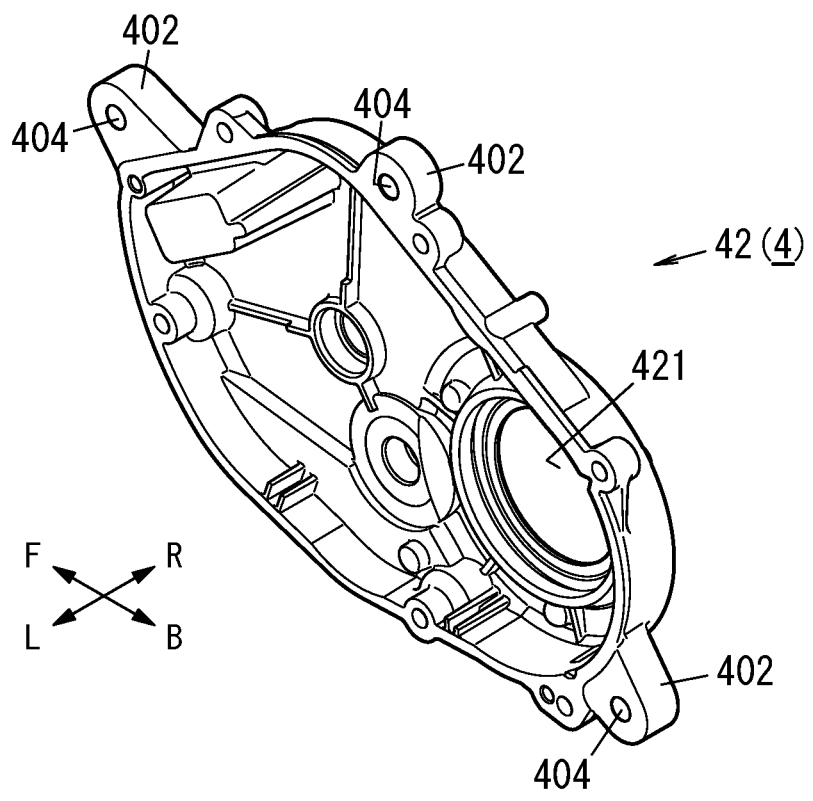
F ↖↗ R
L ↙↘ B

F ←→ B

R
↑
F ←→ B
↓
L

F ↘↗ R
L ↗↘ B

F ◄——► B

B ◄——► F

F ⟷ B

B ⟷ F

L ⟷ R

L ⟷ R

L ◄──► R

L ◄——► R

MOTOR UNIT AND ELECTRIC BICYCLE

TECHNICAL FIELD

The present disclosure generally relates to a motor unit and an electric bicycle, and more particularly relates to a motor unit including a motor, an input shaft, an input body, an output body, and a speed reducer mechanism and an electric bicycle including such a motor unit.

BACKGROUND ART

An electric assist bicycle equipped with a motor driving unit is known in the art (see, for example, Patent Literature 1).

The motor driving unit of Patent Literature 1 includes a unit case, a motor, a crank shaft, a human driving force transmission body, an interlocking mechanism, and a speed reducer mechanism.

In the electric assist bicycle of Patent Literature 1, the crank shaft is supported by two beings to the unit case.

However, the crank shaft tends to shake radially in its part between the two bearings, thus often causing instability in rotation, which is a problem.

CITATION LIST

Patent Literature

Patent Literature 1: WO 2014/184826 A1

SUMMARY OF INVENTION

In view of the foregoing background, it is therefore an object of the present disclosure to provide a motor unit and an electric bicycle, both of which are configured to stabilize the rotation of a rotary shaft unit.

To overcome the problem, a motor unit according to an aspect includes a case, a motor having a rotary shaft housed in the case, an input shaft, an input body, an output body, and a speed reducer mechanism. The input shaft penetrates through the case in an axial direction and is arranged to be rotatable around an axis defining the axial direction. The input body is disposed along an outer peripheral surface of the input shaft and rotates along with the input shaft. The output body is arranged along the outer peripheral surface of the input shaft to be rotatable around the axis and receives rotational force from the input body. The speed reducer mechanism is housed in the case and reduces a rotational speed of the motor and transmits rotational force with the rotational speed thus reduced.

The case includes a first bearing, a second bearing, and a third bearing. The first bearing is located at one end in the axial direction and supports a rotary shaft unit rotatably. The rotary shaft unit includes the input shaft, the input body, and the output body. The second bearing is located at the other end in the axial direction and supports the rotary shaft unit rotatably. The third bearing is located between the first bearing and the second bearing in the axial direction and supports at least one of the input body or the output body rotatably.

To overcome the problem, an electric bicycle according to another aspect includes the motor unit described above.

BRIEF DESCRIPTION OF DRAWINGS

FIG. 8A is a left side view of a first divided part and motor cup of the case of the motor unit;

FIG. 8B is a rear view of the first divided part and the motor cup;

FIG. 10A is a right side view of a second divided part of the case;

FIG. 10B is a rear view of the second divided part;

FIG. 10C is a perspective view of the second divided part as viewed from obliquely above and behind the left side of the second divided part;

DESCRIPTION OF EMBODIMENTS

The present disclosure generally relates to a motor unit and a two-wheeler, and more particularly relates to a motor unit including a motor, an input shaft, an input body, an output body, and a speed reducer mechanism and an electric bicycle (such as an electric assist bicycle or an e-bike) including such a motor unit.

A first embodiment of a motor unit and electric bicycle according to the present disclosure will be described with reference to FIGS. 1-16.

Figure 1:
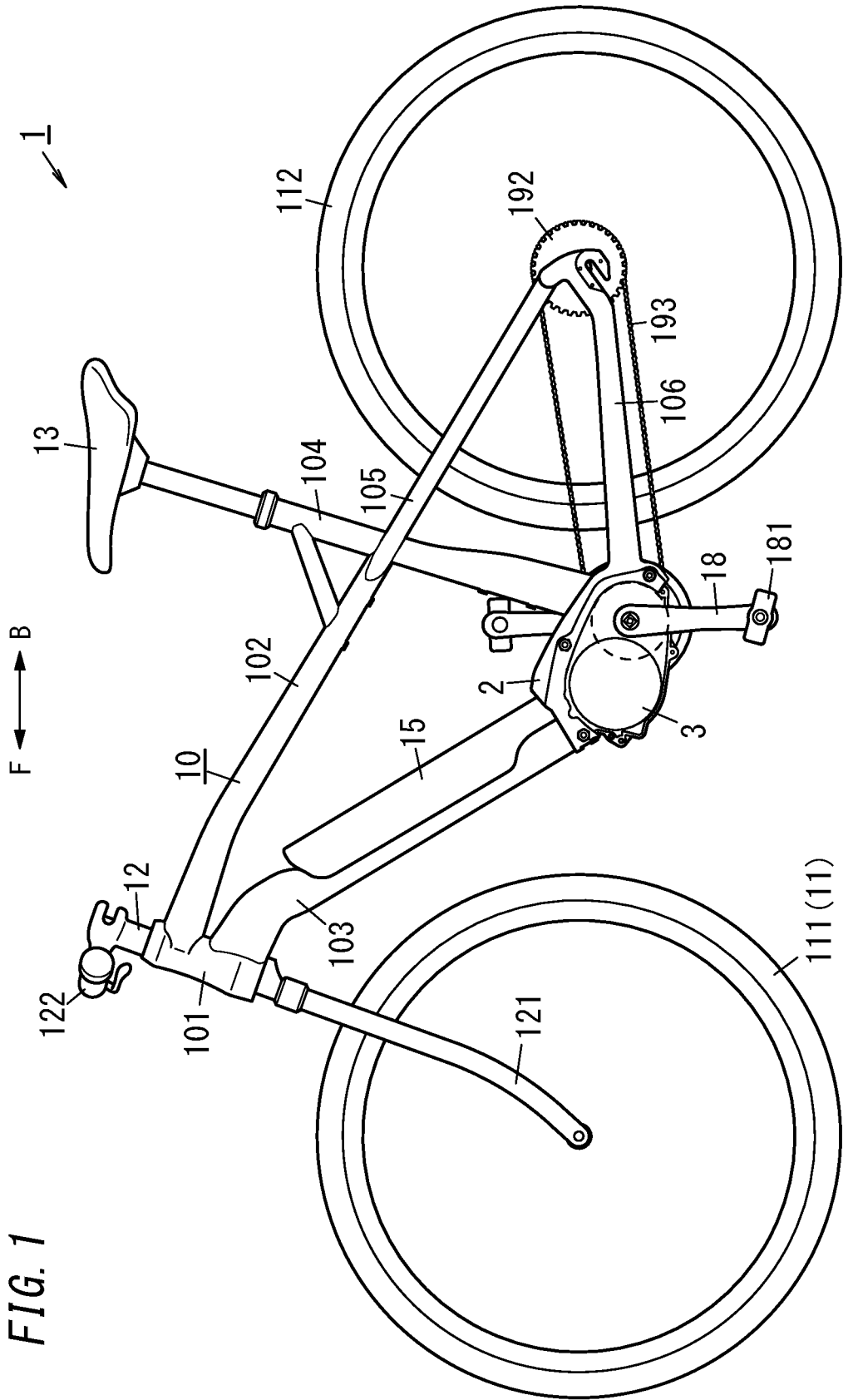
FIG. 1 is side view of an electric bicycle according to a first embodiment.

As shown in FIG. 1, the electric bicycle 1 includes a frame 10, wheels 11, and a motor unit 3. Note that the traveling direction of the electric bicycle 1 is determined by its design. In the following description, the traveling direction is supposed to be a forward direction and the opposite direction thereof is supposed to be a backward direction. In addition, a rightward direction and a leftward direction are supposed to be defined in a state where the electric bicycle 1 faces forward.

The frame 10 supports a person who rides the electric bicycle 1 (hereinafter referred to as a "rider"). The loads of the frame 10 and the rider are supported by the ground via a front wheel 111 and a rear wheel 112 that form the wheels 11.

The frame 10 includes a head tube 101, a top tube 102, a down tube 103, a seat tube 104, seat stays 105, chain stays 106, and a bracket 2. The frame 10 is made of a metal such as aluminum or stainless steel, which may contain a non-metallic material as well. Alternatively, the entire frame 10 may also be made of a non-metallic material. Thus, the frame 10 may be made of any material without limitation.

Figure 2:
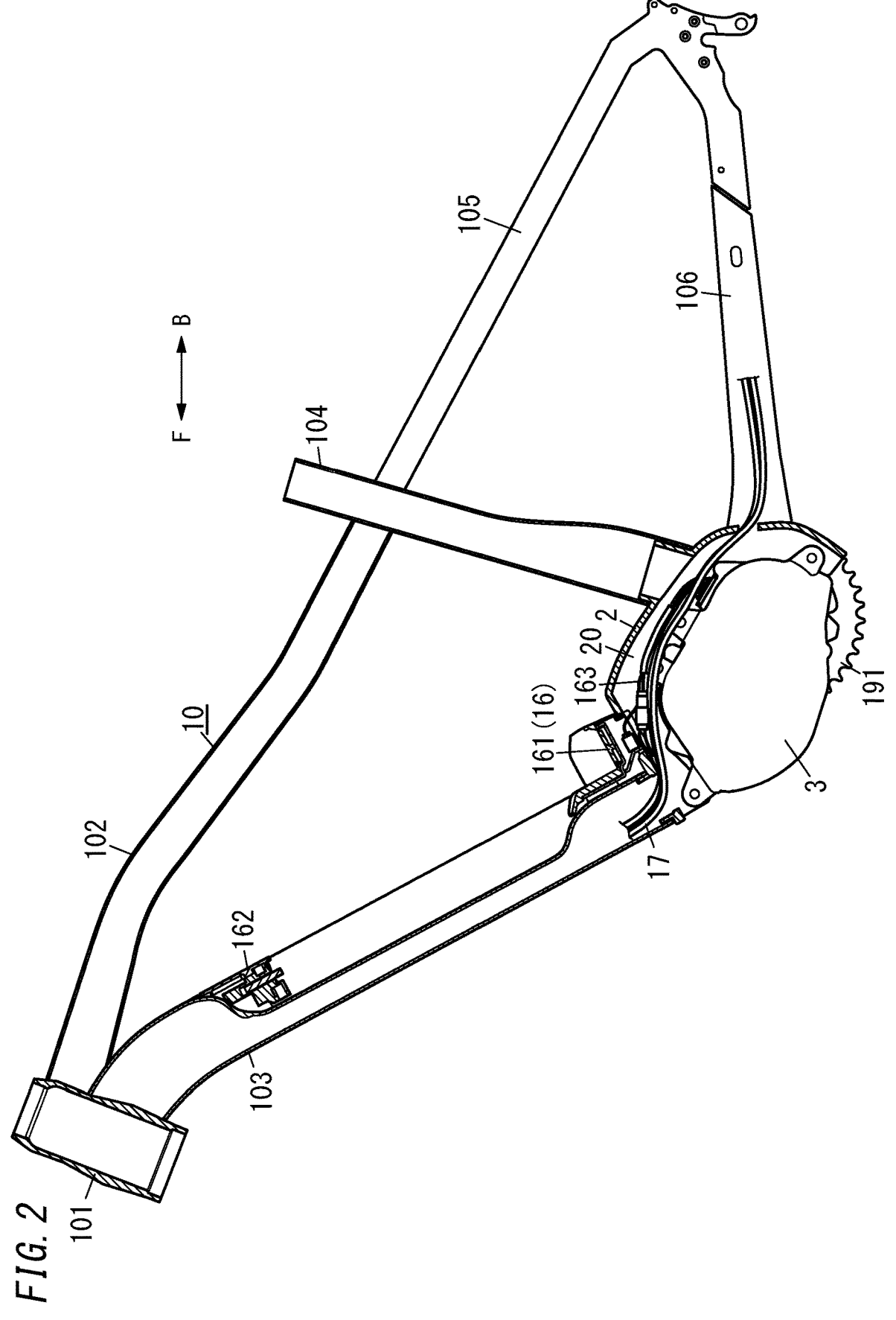
FIG. 2 is a cross-sectional view of a frame and motor unit of the electric bicycle.

As shown in FIG. 2, the head tube 101 is a cylindrical member, of which the opening extends generally in the upward/downward direction. As used herein, the phrase "generally in the upward/downward direction" refers to a direction which defines an angle of approximately 30 degrees or less with respect to the vertical direction. As shown in FIG. 1, a handlebar stem 12 is inserted into the head tube 101 to penetrate through the head tube 101 in the upward/downward direction. The handlebar stem 12 is inserted into the head tube 101 so as to be rotatable around an axial direction. At the bottom of the handlebar stem 12, provided is a fork 121, on which the front wheel 111 is mounted rotatably. To the top of the handlebar stem 12, fixed are handlebars 122. The handlebars 122 are provided with an at-hand operating unit for use to, for example, turn a power switch ON or OFF and a derailleur operating unit for changing the speed of the electric bicycle 1 by using a derailleur (transmission) provided for the rear wheel 112.

As shown in FIG. 2, the top tube 102 is a cylindrical member which extends generally backward from the head tube 101. The top tube 102 does not have to be a straight member. As used herein, the phrase "generally backward" refers to a direction which defines an angle of approximately 40 degrees or less with respect to the backward direction. A frontend portion of the top tube 102 is fixed by welding, for example, to a rear sidewall of the head tube 101. A rear end portion of the top tube 102 is fixed onto the seat tube 104.

Figure 3:
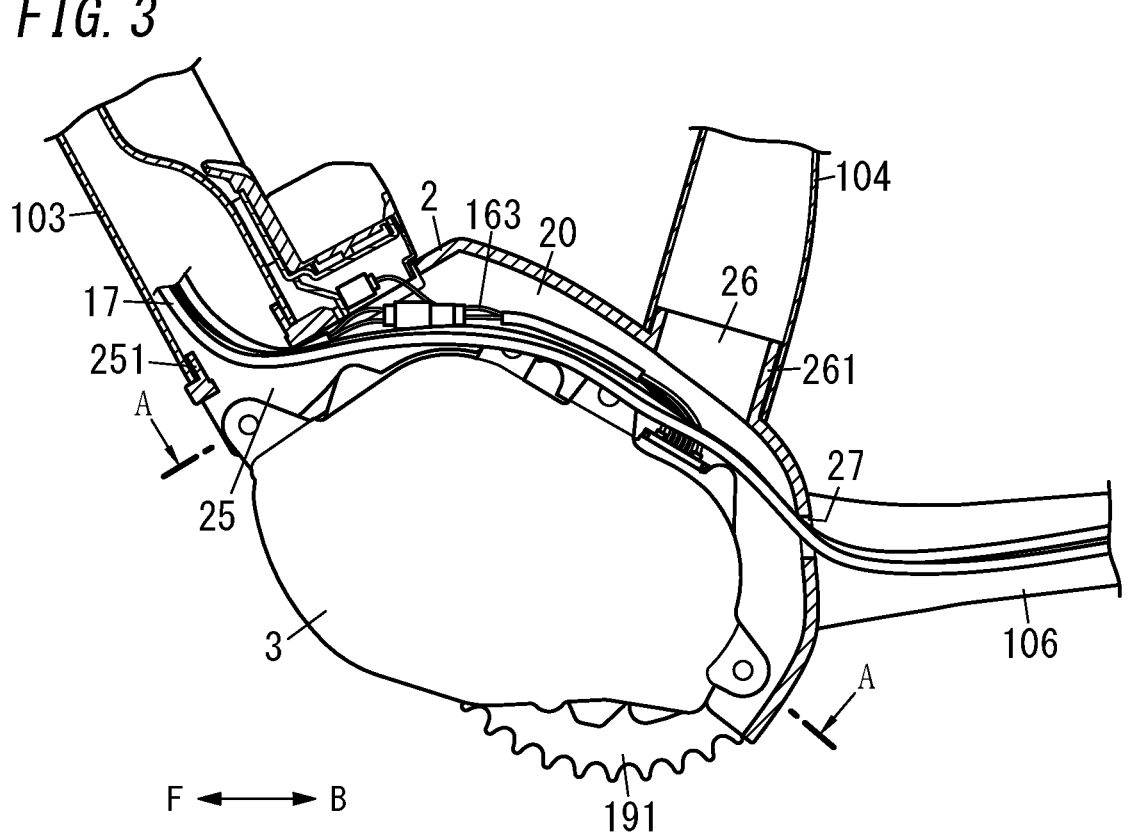
FIG. 3 is an enlarged view of the motor unit and surrounding members shown in FIG. 2.

The seat tube 104 is a cylindrical member, of which opening extends generally in the upward/downward direction. To a front sidewall near an upper end portion of the seat tube 104, the rear end portion of the top tube 102 is fixed by welding, for example. Into the opening at the upper end portion of the seat tube 104, inserted is a seat post extending downward from a saddle 13 as shown in FIG. 1. Fixing the seat post onto the seat tube 104 allows the saddle 13 to be fixed onto the seat tube 104. As shown in FIG. 3, the bracket 2 is fixed to a lower end portion of the seat tube 104.

As shown in FIG. 2, the down tube 103 is a cylindrical member which extends generally diagonally downward and backward from the head tube 101. The down tube 103 does not have to be a straight member. As used herein, the phrase "generally diagonally downward and backward" refers to a direction which points obliquely downward with respect to both the backward direction and the direction in which the head tube 101 extends. A frontend portion of the down tube 103 is fixed by welding, for example, to a rear sidewall of the head tube 101 such that the down tube 103 is fixed below a point where the top tube 102 is fixed. The bracket 2 is fixed onto a rear end portion of the down tube 103 as shown in FIG. 3.

Figure 4:
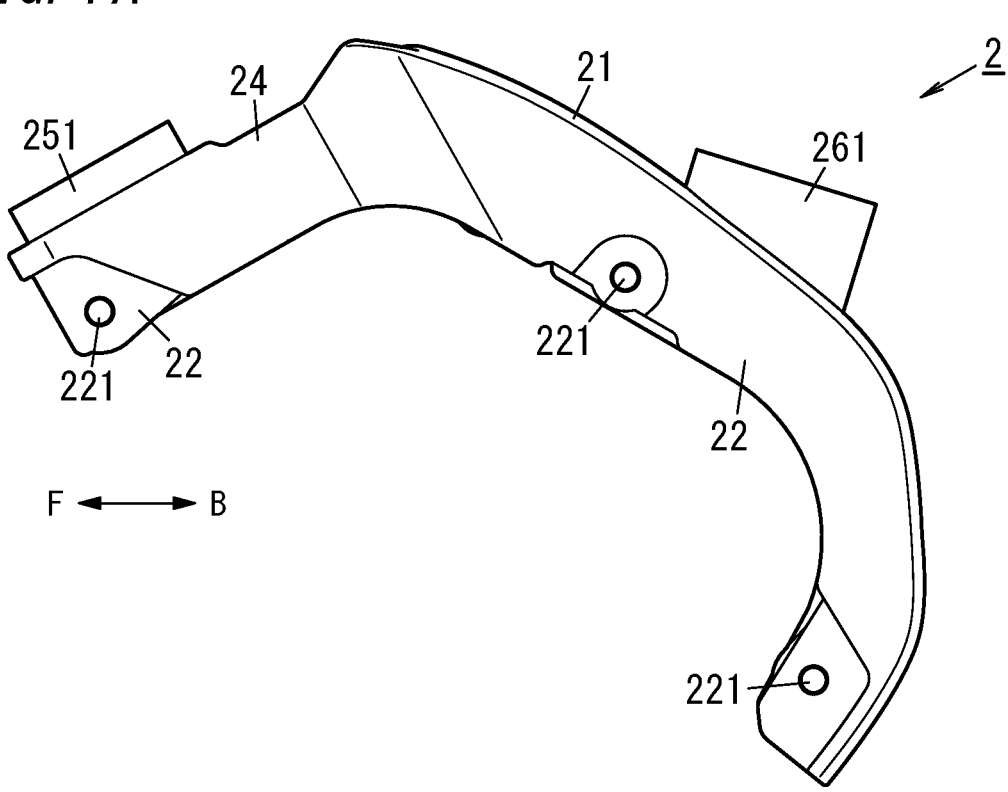
FIG. 4A is a left side view of a bracket of the frame.
FIG. 4B is a perspective view of the bracket as viewed from obliquely below and behind the left side of the bracket.
Figure 4:
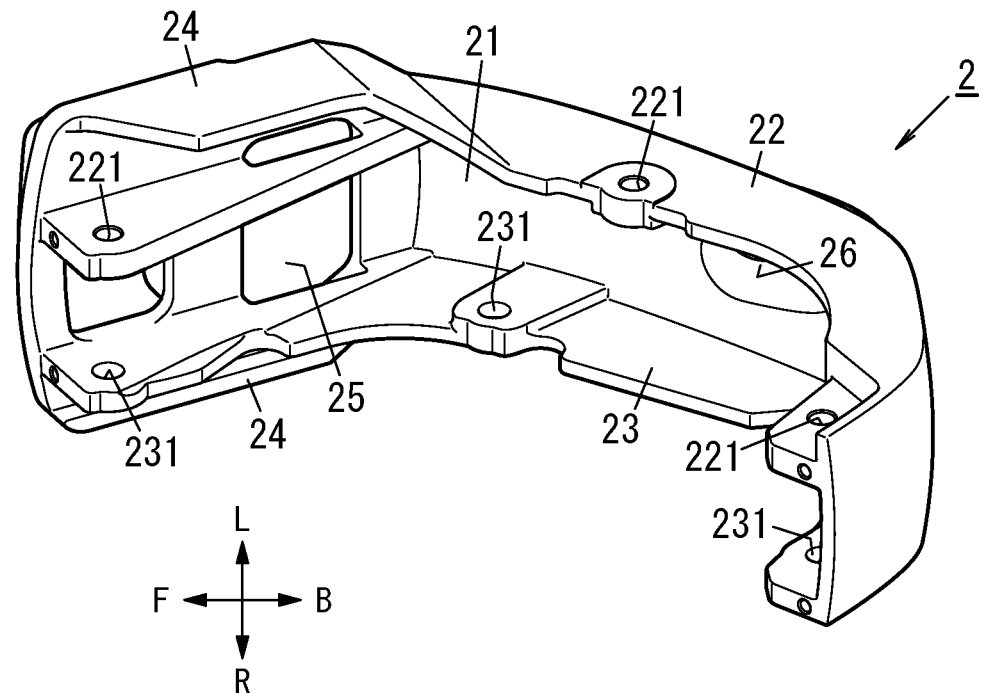
Figures 5A, 5B, 5C:
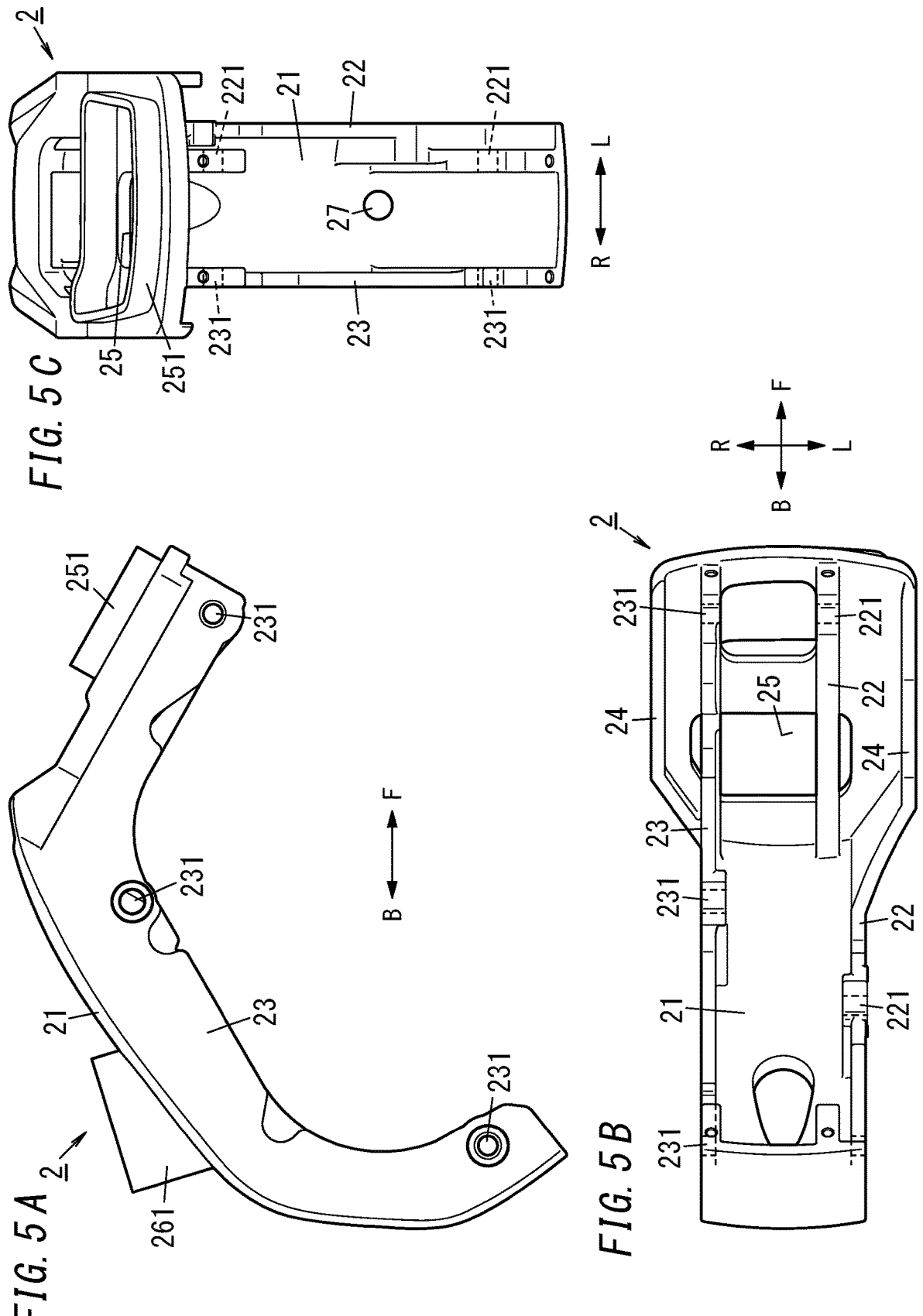
FIG. 5A is a right side view of the bracket.
FIG. 5B is a bottom view of the bracket.
FIG. 5C is a front view of the bracket.

The bracket 2 is illustrated in FIGS. 4A-5C. The bracket 2 forms part of the frame 10 and supports the motor unit 3. As shown in FIGS. 4A and 5A, the bracket 2 may have a shape in which a middle portion thereof in the forward/backward direction is curved upward when viewed in the rightward/leftward direction. However, the bracket 2 does not have to have such a shape but may also be formed to extend linearly in the forward/backward direction. As shown in FIG. 5B, the bracket 2 includes an upper piece 21, of which the longitudinal axis is generally aligned with the forward/backward direction. As shown in FIGS. 4B, 5B, and 5C, a first side piece 22 protrudes downward from one end (e.g., the left end in the first embodiment) of the latitudinal axis, perpendicular to the longitudinal axis, of the upper piece 21 and a second side piece 23 protrudes downward from the other end (e.g., the right end in the first embodiment) of the latitudinal axis of the upper piece 21. In addition, at the front portion of the bracket 2, a cover piece 24 is provided on the left of the first side piece 22 and on the right of the second side piece 23 to partially cover the first side piece 22 and the second side piece 23, respectively.

Figure 6:
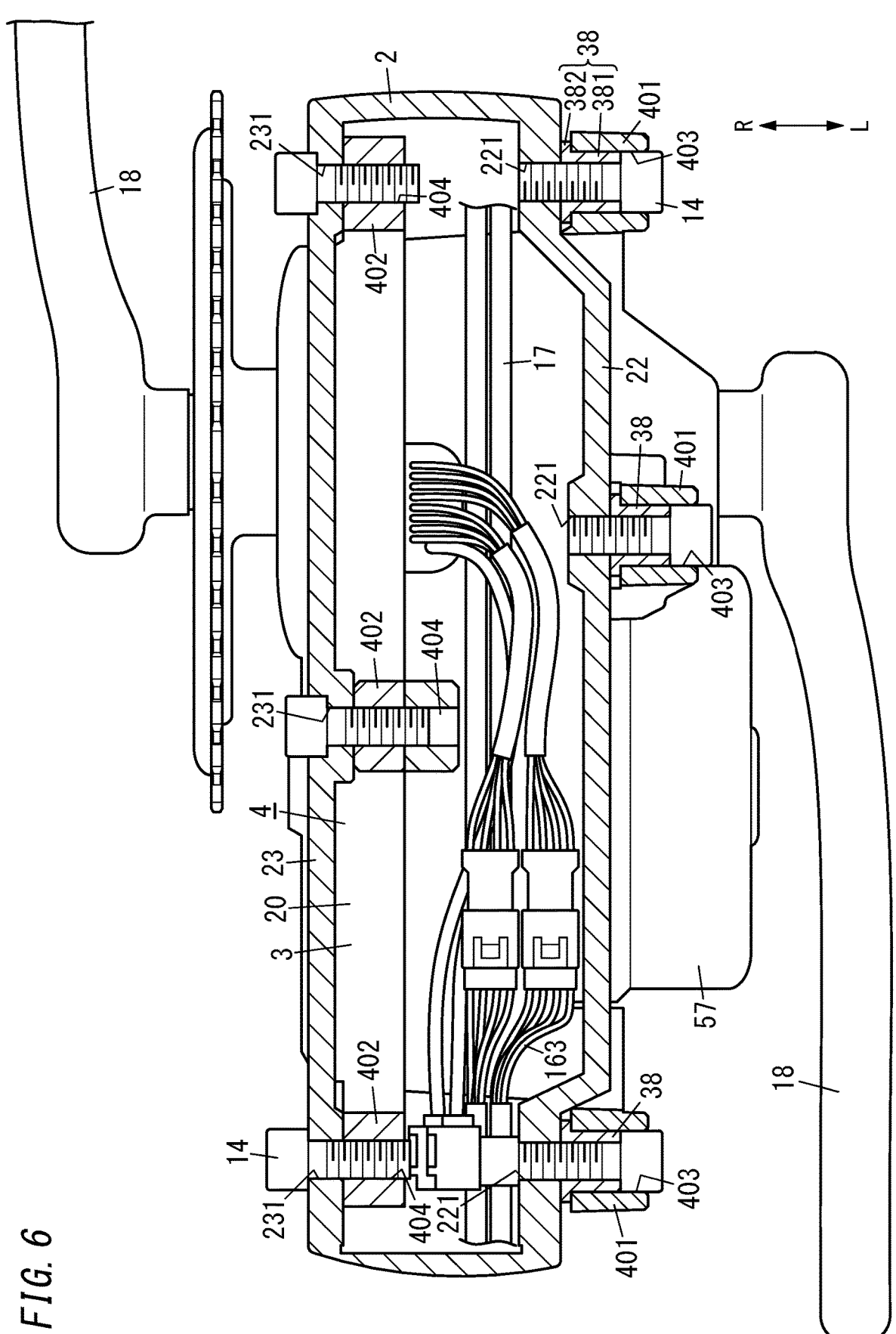
FIG. 6 is a cross-sectional view thereof taken along the plane A-A shown in FIG. 3.
Figure 12:
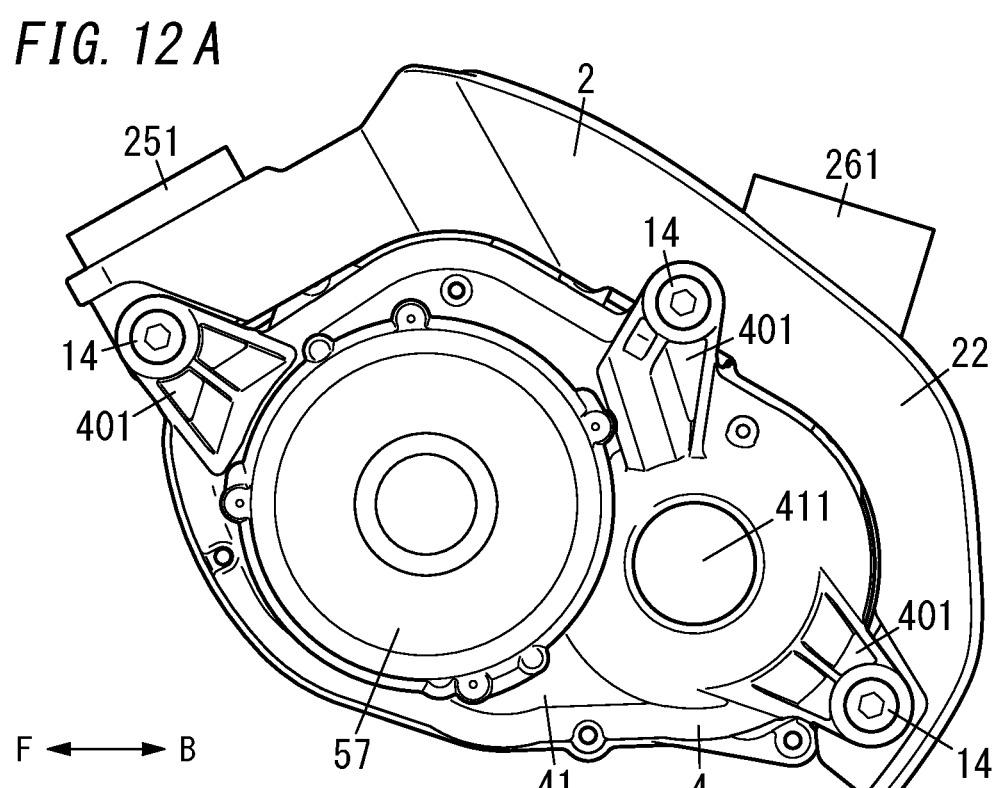
FIG. 12A is a left side view of the case and the bracket that are fastened to each other.
FIG. 12B is a right side view of the case and the bracket that are fastened to each other.
Figure 12:
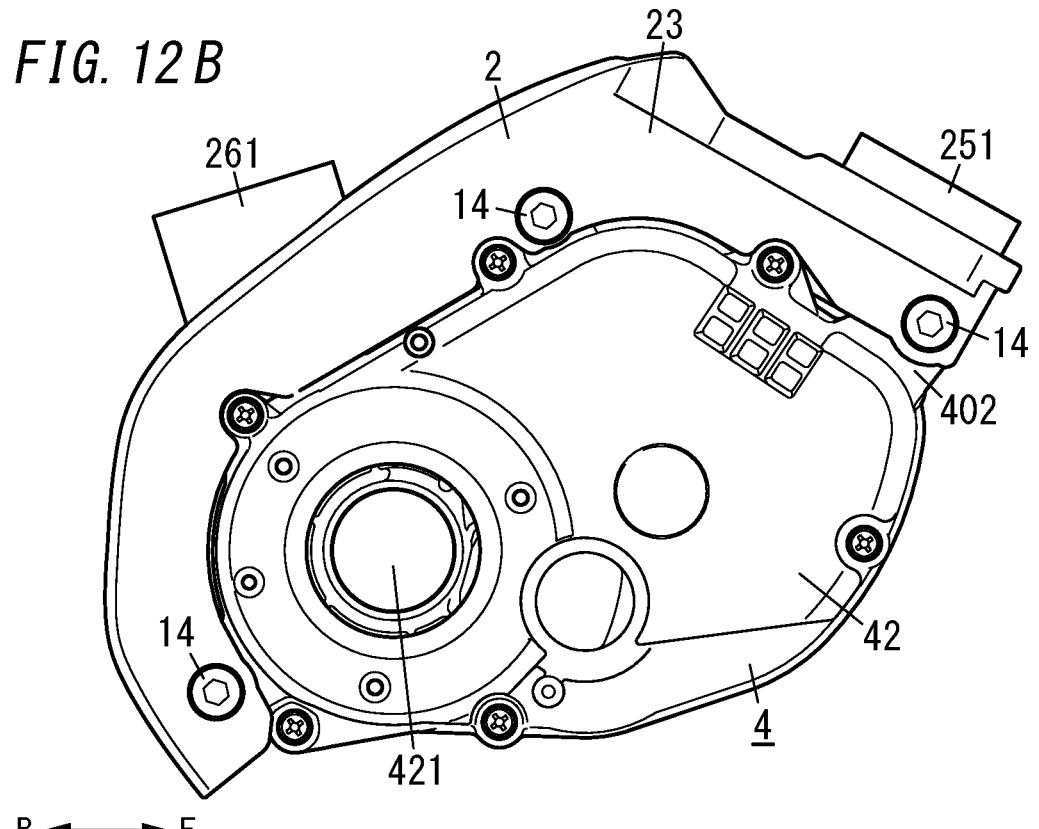
Figure 13:
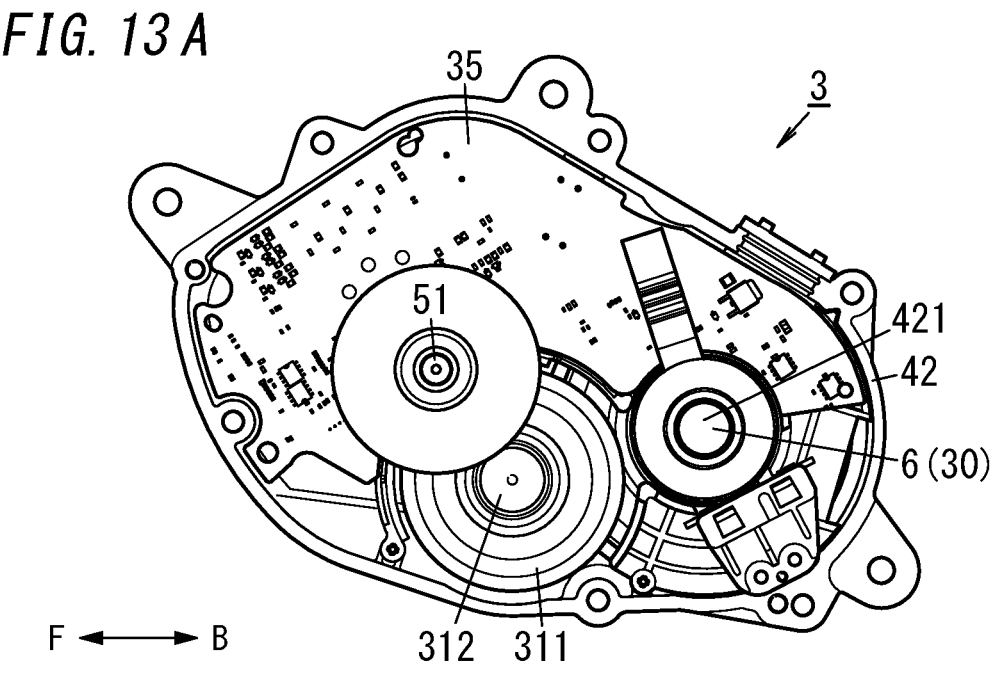
FIG. 13A is a left side view illustrating the motor unit with some members, including the first divided part, removed.
FIG. 13B is a right side view illustrating the motor unit with some members, including the second divided part, removed.
Figure 13:
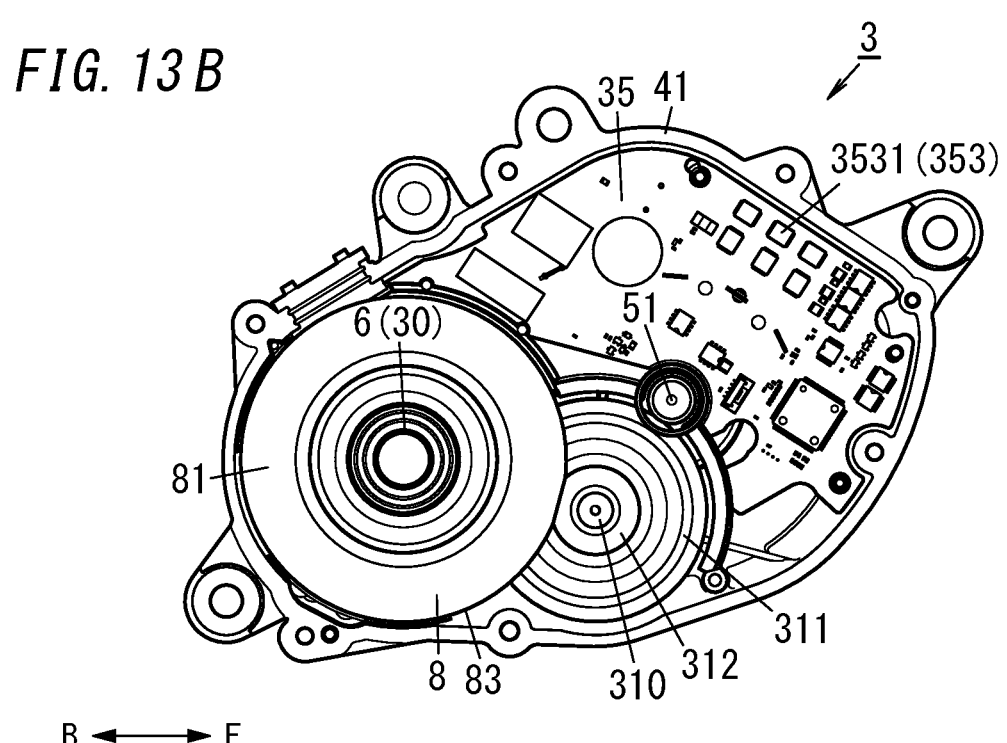

Below the bracket 2, fixed is the motor unit 3. The motor unit 3 is supported by the bracket 2. As shown in FIGS. 12 and 6, the motor unit 3 is fixed to the bracket 2 with fastening members 14 such as bolts or nuts and bolts. FIG. 6 is a cross-sectional view taken along the plane A-A (aligned with a cabling space 20) shown in FIG. 3. The bracket 2 will be described in detail later.

As shown in FIG. 3, to a frontend portion of the bracket 2, a rear end portion of the down tube 103 is fixed by fitting (which may also be shrink fitting), binding, or welding, for example. In the first embodiment, the frontend portion of the bracket 2 has a through hole 25 which penetrates through the bracket 2 in the upward/downward direction. A cylindrical portion 251 protrudes from a region surrounding the through hole 25. This cylindrical portion 251 is covered with, and fitted into, the rear end portion of the down tube 103.

To a middle portion of the bracket 2 in the forward/backward direction, a lower end portion of the seat tube 104 is fixed by fitting (which may also be shrink fitting), binding, or welding, for example. In the first embodiment, the middle portion of the bracket 2 has a through hole 26 which penetrates through the bracket 2 in the upward/downward direction. A cylindrical portion 261 protrudes from a region surrounding the through hole 26. This cylindrical portion 261 is covered with, and fitted into, the lower end portion of the seat tube 104.

To a rear end portion of the bracket 2, respective frontend portions of the chain stays 106 are fixed by fitting (which may also be shrink fitting), binding, or welding, for example. The chain stays 106 are two hollow or solid members which extend generally backward from the bracket 2. In the first embodiment, to the rear end portion of the bracket 2, respective frontend portions of the chain stays 106, each having a cylindrical shape, are fixed by welding. In addition, the bracket 2 also has through holes 27, which penetrate through the bracket 2 in the forward/backward direction, at positions corresponding to respective internal spaces of the chain stays 106.

As shown in FIG. 1, to a rear end portion of the top tube 102, respective frontend portions of the seat stays 105 are fixed by fitting (which may also be shrink fitting), binding, or welding, for example. The seat stays 105 are two hollow or solid members which extend generally backward from around the upper end portion of the seat tube 104. In the first embodiment, respective frontend portions of the seat stays 105, each having a cylindrical shape, are fixed by welding, for example. The respective rear end portions of the seat stays 105 are fixed to their associated rear end portions of the chain stays 106. The rear wheel 112 is mounted rotatably on their coupling portions.

Furthermore, as shown in FIG. 2, the bracket 2 and the down tube 103 include a battery attachment 16, to which a battery 15 (see FIG. 1) for use to supply power to the motor unit 3 is attached. The battery attachment 16 includes a lower supporting portion 161 formed on the bracket 2 and an upper supporting portion 162 formed on the down tube 103. The lower supporting portion 161 supports the battery 15 by having a lower end portion of the battery 15 attached thereto such that the battery 15 does not drop off easily. In addition, the lower supporting portion 161 further includes a plurality of terminals to be respectively electrically connected to a plurality of power feeding or signal-transmitting battery terminals provided at the lower end portion of the battery 15. To each of the plurality of terminals, one end of a cable 163 is electrically connected.

The upper supporting portion 162 includes a locking device for locking the battery 15 thereon by having an upper end portion of the battery 15 attached thereto such that the battery 15 does not drop off easily.

Meanwhile, through the down tube 103 and the cabling space 20, a shift cable 17 for connecting a derailleur operating unit to a derailleur mechanism and a brake cable are passed.

Next, the motor unit 3 will be described with reference to FIG. 7 and other drawings. The motor unit 3 includes a case 4, a motor 5, an input shaft 6, an input body 7, an output body 8, and a speed reducer mechanism 31.

The case 4 forms the shell of the motor unit 3. The case 4 houses, in its internal housing space, various pieces of equipment including the speed reducer mechanism 31. The case 4 is typically made of a metallic material such as aluminum or stainless steel but may also be made of a non-metallic material. That is to say, the case 4 may be made of any material without limitation. As shown in FIGS. 11A-11C, the case 4 includes a case body 400 having an internal housing space, and a plurality of first attachment pieces 401 and second attachment pieces 402 protruding upward from the case body 400 and designed to be attached to the bracket 2.

The case 4 includes a first divided part 41 located on the left and a second divided part 42 located on the right. The case 4 is formed by assembling the first divided part 41 and the second divided part 42 together. The case 4 will be described in further detail later.

Figure 7:
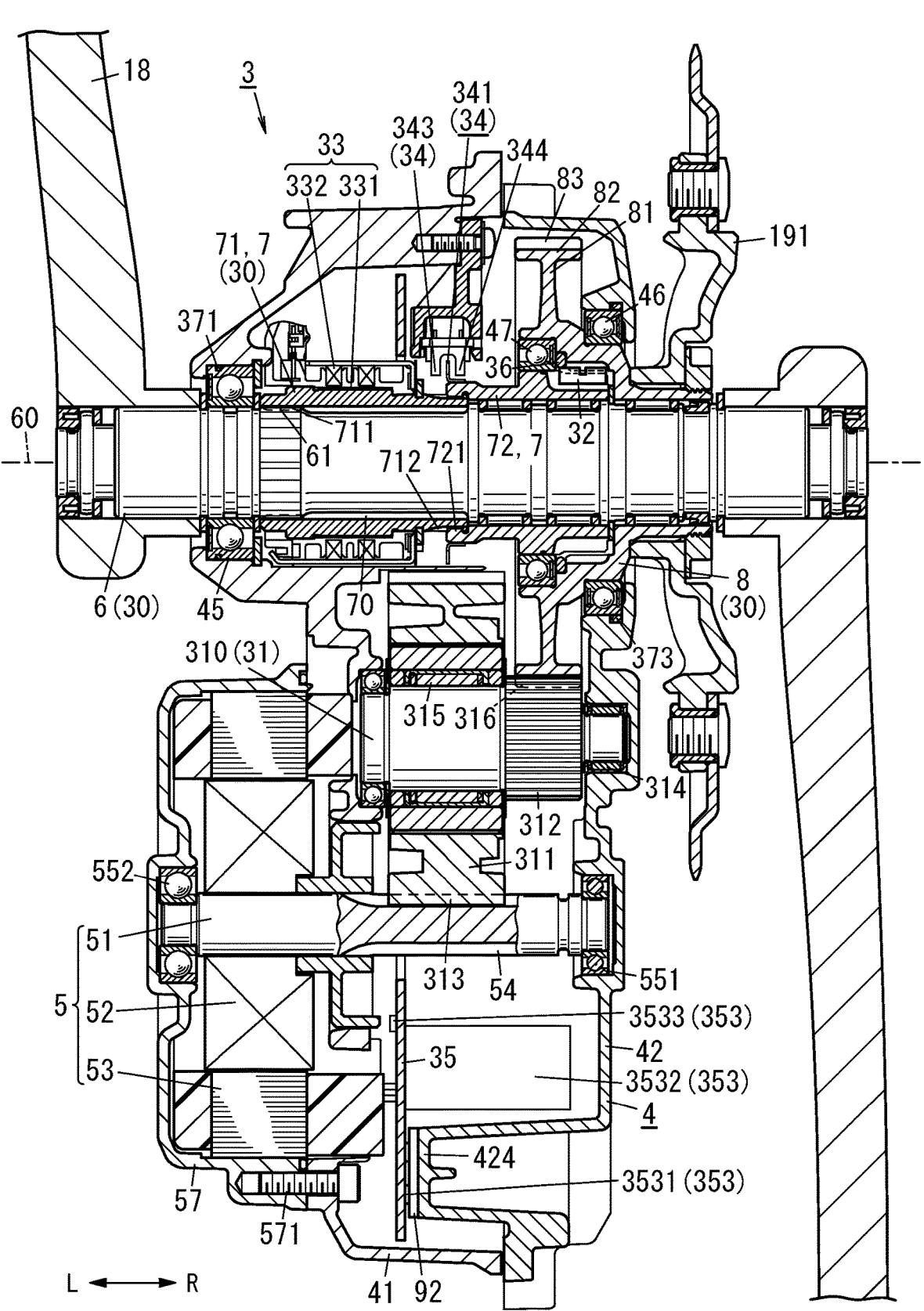
FIG. 7 is a cross-sectional view of the motor unit as taken along planes that respectively pass through an input shaft of the motor unit, a rotary shaft of its motor, and an axis of a transmission rotary shaft of a speed reducer mechanism.
Figures 8A, 8B:
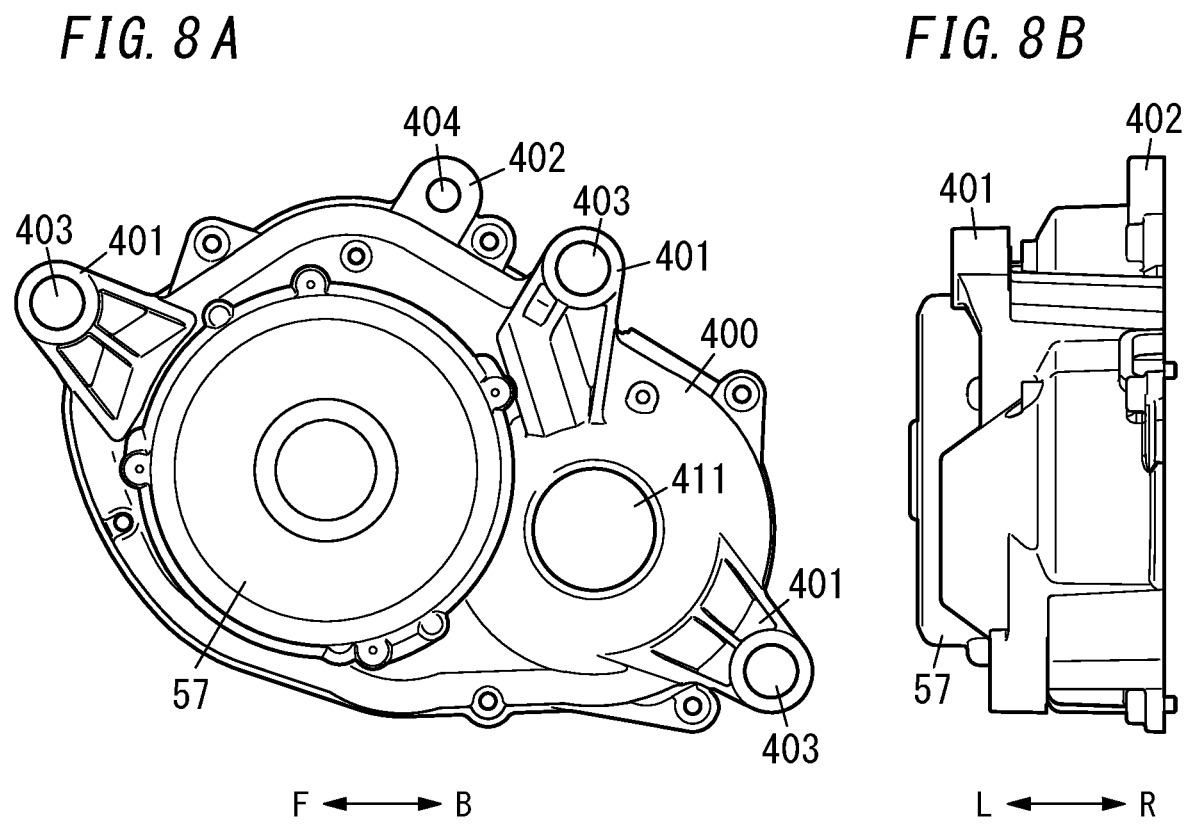
Figure 9A:
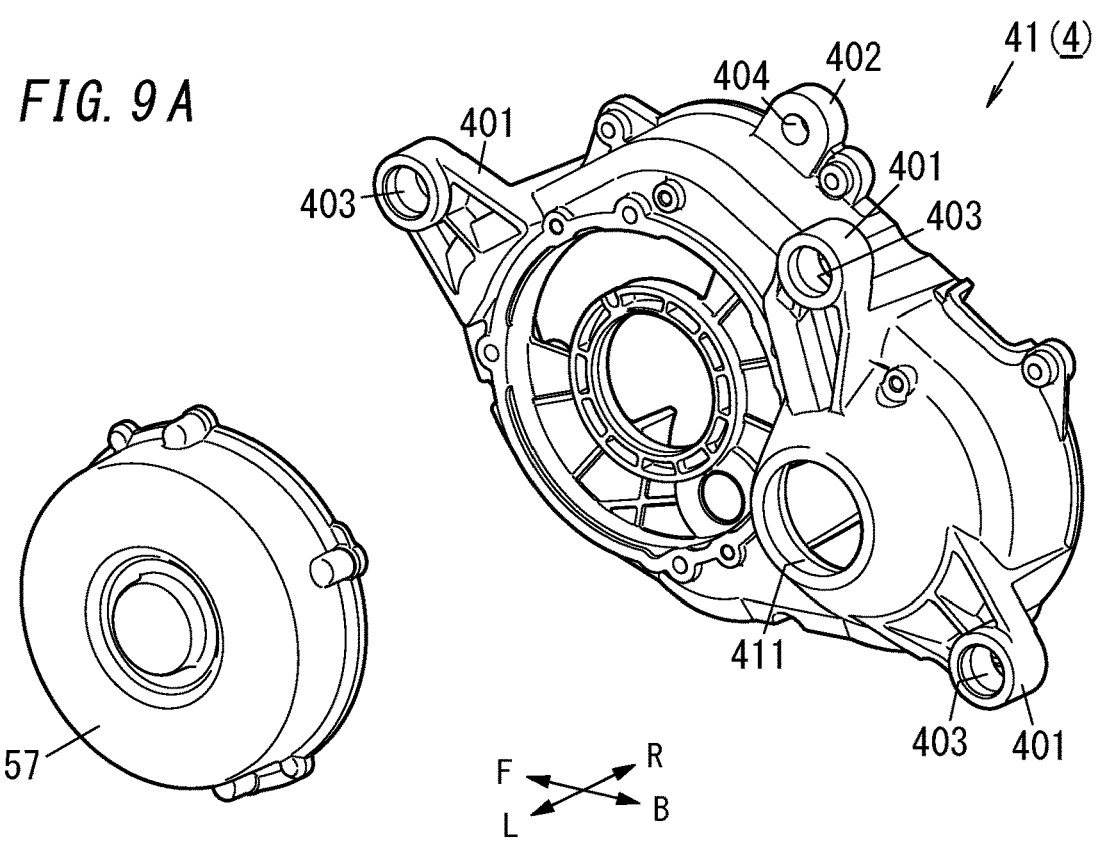
FIG. 9A is an exploded perspective view of the first divided part and the motor cup as viewed from obliquely above and behind the left side of the first divided part and the motor cup.
Figure 9B:
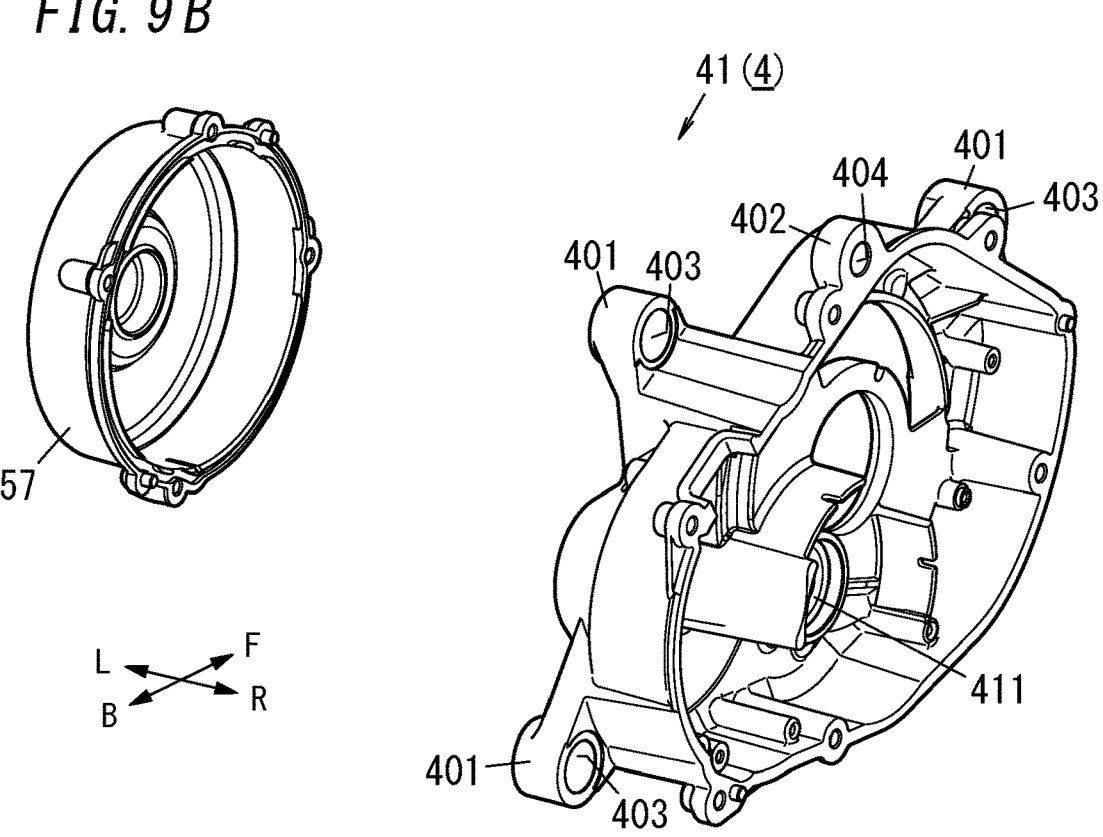
FIG. 9B is an exploded perspective view of the first divided part and the motor cup as viewed from obliquely above and behind the right side of the first divided part and the motor cup.
Figure 11:
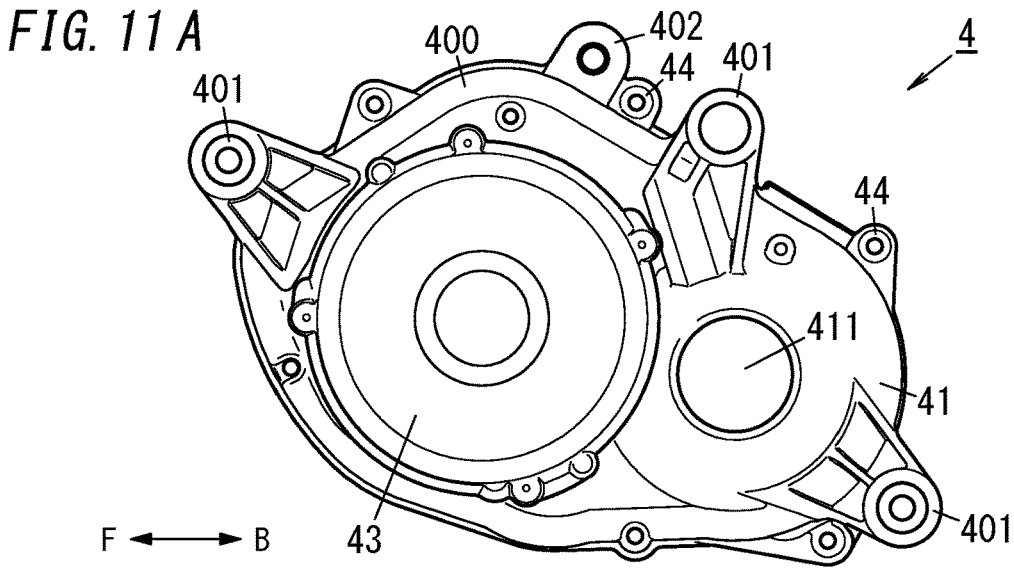
FIG. 11A is a left side view of the case.
FIG. 11B is a plan view of the case.
FIG. 11C is a perspective view of the case as viewed from obliquely above and behind the left side of the case.

As shown in FIGS. 7 and 8B, when viewed in the rightward/leftward direction, the first divided part 41 has a peripheral edge portion protruding to the right with respect to its portion inside the peripheral edge portion. The internal housing space of the first divided part 41 is opened to the right. The motor cup 57 protruding toward one end in the latitudinal direction and housing the motor 5 inside is attached to a portion of the first divided part 41. As shown in FIGS. 9A and 9B, the motor cup 57 is formed separately from the first divided part 41. As shown in FIG. 7, the motor cup 57 is fixed to the first divided part 41 with fastening members 571 such as bolts.

As shown in FIGS. 7 and 10B, when viewed in the rightward/leftward direction, the second divided part 42 has a peripheral edge portion protruding to the left with respect to its portion inside the peripheral edge portion. The internal housing space of the second divided part 42 is opened to the left. As shown in FIGS. 11A-11C, the first divided part 41 and the second divided part 42 are merged with each other in the rightward/leftward direction such that their respective housing spaces are continuous with each other and are fixed to each other with fastening members 44 such as bolts. The case 4 is formed by fixing the first divided part 41 and the second divided part 42 to each other. Note that the dimensions, shape, thickness, and other parameters of the case 4 are not limited to any particular ones. Also, the housing space formed inside the case 4 may or may not be hermetically sealed.

As shown in FIG. 7, the motor 5 is attached to the case 4. More specifically, the motor 5 is mostly housed in the motor cup 57 attached to the first divided part 41. The motor 5 includes a rotary shaft 51, a rotor 52 to rotate along with the rotary shaft 51, and a stator 53. The rotor 52, the stator 53, and a part of the rotary shaft 51 are located inside the motor cup 57. The rotary shaft 51 is housed rotatably such that its axis is aligned with the rightward/leftward direction. The rotary shaft 51 protrudes from the stator 53 toward one of the rightward/leftward directions (e.g., to the right in this embodiment). The outer surface of the protruding portion of the rotary shaft 51 is provided with teeth 54 to mesh with the speed reducer mechanism 31. A right end portion of the rotary shaft 51 is supported by a rotary shaft supporting bearing 551 disposed in the second divided part 42. The left end portion of the rotary shaft 51 does not protrude from the stator 53 but is supported by a rotary shaft supporting bearing 552 disposed in the motor cup 57.

The input shaft 6 is arranged to penetrate through the case 4 in the axial direction 60 (e.g., in the rightward/leftward direction in the first embodiment) and be rotatable around an axis 60 defining the axial direction 60 of the input shaft 6. In the first embodiment, the input shaft 6 is configured as a hollow cylindrical member. However, this is only an example of the present disclosure and should not be construed as limiting. Alternatively, the input shaft 6 may also be configured as a solid member. The input shaft 6 will be described in further detail later.

The case 4 includes a first bearing 45 to rotatably support the input shaft 6. The first bearing 45 is provided at one end in the axial direction 60 (i.e., provided at the left end in the first embodiment). The first divided part 41 has an input shaft hole 411 to allow the input shaft 6 to pass therethrough as shown in FIG. 8A. The first bearing 45 is disposed at the input shaft hole 411 as shown in FIG. 7. In the first embodiment, the first bearing 45 is configured as a ball bearing. Note that the first bearing 45 does not have to be a ball bearing but may also be configured as a roller bearing or any of various other types of bearings.

A sealant 371 such as an O-ring is interposed between the first bearing 45 and the first divided part 41. Providing the sealant 371 reduces the leakage of the grease supplied to the first bearing 45. In this embodiment, the O-ring serving as the sealant 371 is provided between the first bearing 45 and the first divided part 41. Alternatively, the first bearing 45 may be press-fitted into the first divided part 41 with no sealant 371 used.

In addition, the case 4 also includes a second bearing 46 to rotatably support the input shaft 6. The second bearing 46 is provided at the other end in the axial direction 60 (i.e., provided at the right end in the first embodiment). As shown in FIGS. 10A and 10C, the second divided part 42 has an input shaft hole 421 to allow the input shaft 6 to pass therethrough. The second bearing 46 is disposed at the input shaft hole 421 as shown in FIG. 7. In the first embodiment, the input shaft 6 is indirectly supported by the second bearing 46 via the output body 8. In the first embodiment, the second bearing 46 is configured as a ball bearing. Note that the second bearing 46 does not have to be a ball bearing but may also be configured as a roller bearing or any of various other types of bearings.

A sealant 373 such as an O-ring is interposed between the second bearing 46 and the second divided part 42. Providing the sealant 373 reduces the leakage of the grease supplied to the second bearing 46.

The sealant 373 may also be a D-ring, for example, instead of the O-ring, or any other type of ring without limitation.

As shown in FIGS. 1 and 7, one end portion of each crank arm 18 is fixed to an associated end portion of the input shaft 6. To the other end portion of the crank arm 18, attached rotatably is a pedal 181 as shown in FIG. 1. The rider of the electric bicycle 1 may apply manual rotational force to the input shaft 6 by pumping the pedals 181.

As shown in FIG. 7, the input body 7 is disposed along the outer peripheral surface of the input shaft 6 and rotates along with the input shaft 6. The input body 7 is a cylindrical member, its axial direction 60 is aligned with the rightward/leftward direction and is arranged concentrically with the input shaft 6. The length of the input body 7 as measured in the rightward/leftward direction is shorter than the length of the input shaft 6 as measured in the rightward/leftward direction. The input body 7 and the input shaft 6 include fitting portions 711, 61, which are fitted into each other to prevent the input body 7 and the input shaft 6 from rotating relative to each other around the axis 60. The fitting portions 711, 61 are provided in a range in the axial direction 60. In the first embodiment, a left end portion of the input body 7 (more specifically, a first input body 71 to be described later) and a corresponding portion of the input shaft 6 are provided with the fitting portions 711, 61, which are configured as splines or serrations, for example. Alternatively, the fitting portions 711, 61 may also be configured as male and female threads to be fitted into each other.

In the first embodiment, the input body 7 includes a first input body 71 and a second input body 72. The first input body 71 is coupled to the input shaft 6. The first input body 71 is provided in the rightward/leftward direction for a part of the input shaft 6 and is housed in the first divided part 41. At the left end portion of the first input body 71, provided is the fitting portion 711 to be fitted onto the input shaft 6. On the right of the fitting portion 711 provided at the left end portion of the first input body 71, a gap 70 is left between the input shaft 6 and the first input body 71. This makes it easier to insert the input shaft 6 into the first input body 71 having the cylindrical shape.

The second input body 72 is provided at a different position in the axial direction 60 from the first input body 71 (e.g., provided on the right of the first input body 71 in the first embodiment), is coupled to the first input body 71, and transmits the rotational force to the first output body 8. Optionally, part of the second input body 72 may be located at the same position in the rightward/leftward direction as the first input body 71. In the first embodiment, a left end portion of the second input body 72 is located radially outside of a right end portion of the first input body 71, and therefore, the first input body 71 and the second input body 72 radially overlap with each other. The first input body 71 and the second input body 72 include fitting portions 712, 721, which are fitted into each other to prevent the first input body 71 and second input body 72 from rotating relative to each other around the axis 60. In the first embodiment, a right end portion of the first input body 71 and a left end portion of the second input body 72 are provided with the fitting portions 712, 721, which are configured as splines or serrations, for example. As used herein, the phrase "radially overlap with each other" refers to a state where at least respective parts of two members overlap with each other when viewed radially.

The output body 8 is arranged along the outer peripheral surface of the input shaft 6 to be rotatable around an axis 60. The output body 8 receives the rotational force from the input body 7. The output body 8 is a generally cylindrical member, its axial direction 60 is aligned with the rightward/leftward direction and is disposed concentrically with the input shaft 6. The length of the output body 8 as measured in the rightward/leftward direction is shorter than the length of the input shaft 6 as measured in the rightward/leftward direction. A right end portion of the output body 8 protrudes out of the case 4 through the input shaft hole 421 of the second divided part 42. The output body 8 is supported by the second bearing 46 disposed in the second divided part 42. The output body 8, the input shaft 6, and the input body 7 together form a rotary shaft unit 30. The rotary shaft unit 30 is supported by the case 4 via the first bearing 45 and the second bearing 46.

A front sprocket 191 is fixed to the portion, protruding out of the case 4, of the output body 8. The front sprocket 191 rotates along with the output body 8. In addition, as shown in FIG. 1, a rear sprocket 192 is fixed to a hub of the rear wheel 112. A chain 193 is hung around between the front sprocket 191 and the rear sprocket 192.

As shown in FIG. 7, in the first embodiment, a one-way clutch 32 is interposed between the input body 7 and the output body 8. The one-way clutch 32 is configured to, when rotational force is applied in a direction in which the electric bicycle 1 is accelerated in the traveling direction (hereinafter referred to as an "accelerating direction") to the input body 7, transmit the rotational force to the output body 8 and is also configured to, when rotational force is applied in a direction opposite from the accelerating direction to the input body 7, not transmit the rotational force to the output body 8. Also, when the rotational force is applied in the accelerating direction to the output body 8 via a speed reducer mechanism 31 (to be described later), the one-way clutch 32 does not transmit the rotational force to the input body 7. In the first embodiment, the one-way clutch 32 includes a latchet and is supplied with grease. Various types of members may be used as appropriate as the one-way clutch 32 without limitation. For example, a roller type one-way clutch or a sprag type one-way clutch may be used.

Furthermore, in the first embodiment, in some range in the axial direction 60, the second input body 72 and the output body 8 overlap with each other in the radial direction for the input shaft 6. The one-way clutch 32 is interposed between the second input body 72 and the output body 8 that overlap with each other in the radial direction.

The second bearing 46 overlaps, in some range in the axial direction 60, with the one-way clutch 32 in the radial direction for the input shaft 6. In the first embodiment, the second bearing 46 is located outside of the one-way clutch 32.

The output body 8 includes, in a region where the output body 8 overlaps with the input body 7 in the axial direction 60, a web 81 and a rim 82, which are provided adjacent to the outer peripheral surface. The web 81 protrudes radially outward. The rim 82 is continuous with a radially outer end portion of the web 81. The length of the rim 82 as measured in the axial direction 60 is greater than the length of the web 81 as measured in the axial direction 60. The rim 82 has, on the outer peripheral surface thereof, teeth 83 to mesh with the speed reducer mechanism 31.

The speed reducer mechanism 31 is housed in the case 4 and reduces the rotational speed of the motor 5 and transmits rotational force with the rotational speed thus reduced to the output body 8. The speed reducer mechanism 31 includes a first transmission gear 311 and a second transmission gear 312. The outer diameter of the first transmission gear 311 is larger than the outer diameter of the second transmission gear 312. The number of teeth of the first transmission gear 311 is larger than the number of teeth of the second transmission gear 312.

The first transmission gear 311 is caused to rotate by the rotational force of the rotary shaft 51 of the motor 5. In the first embodiment, the first transmission gear 311 is configured as a cylindrical member. On the outer peripheral surface of the first transmission gear 311, formed are teeth 313 to mesh with the teeth 54 formed on the rotary shaft 51 of the motor 5. The first transmission gear 311 is disposed along the outer peripheral surface of a transmission rotary shaft 310 of the speed reducer mechanism 31. In the first embodiment, the first transmission gear 311 is configured to receive the rotational force directly from the rotary shaft 51 of the motor 5. Alternatively, a gear may be interposed between the first transmission gear 311 and the rotary shaft 51 of the motor 5.

The transmission rotary shaft 310 is housed rotatably in the case 4 such that its axis is aligned with the rightward/leftward direction. The transmission rotary shaft 310 is located backward of the rotary shaft 51 of the motor 5 and is disposed at substantially the same position in the rightward/leftward direction as a portion, protruding to the right from the stator 53, of the rotary shaft 51. A right end portion of the transmission rotary shaft 310 is supported by a transmission rotary shaft supporting bearing 314 provided in the second divided part 42.

The first transmission gear 311 is coupled to the transmission rotary shaft 310 via a one-way clutch 315. The one-way clutch 315 transmits, when rotational force is applied to the first transmission gear 311 in the accelerating direction, the rotational force to the transmission rotary shaft 310 but does not transmit, when rotational force is applied in the direction opposite from the accelerating direction, the rotational force to the transmission rotary shaft 310. In addition, when rotational force is applied to the transmission rotary shaft 310 in the accelerating direction, the one-way clutch 315 does not transmit the rotational force to the first transmission gear 311.

The second transmission gear 312 is fixed on the right of a portion, where the one-way clutch 315 is fixed, of the transmission rotary shaft 310 to rotate along with the transmission rotary shaft 310. The second transmission gear 312 transmits the rotational force received from the first transmission gear 311 via the transmission rotary shaft 310 to the teeth 83 of the output body 8. The second transmission gear

312 has, on its outer peripheral surface, teeth 316 to mesh with the teeth 83 formed on the rim 82 of the output body 8.

As the rider pumps the pedals 181 of the electric bicycle 1, rotational force is applied to the input shaft 6 in the accelerating direction. As the input shaft 6 rotates, the first input body 71 and the second input body 72 also rotate along with the input shaft 6. The rotational force applied to the second input body 72 in the accelerating direction turns into rotational force applied via the one-way clutch 32 to the output body 8 in the accelerating direction, thus rotating the output body 8 and the front sprocket 191 in the accelerating direction. As the front sprocket 191 rotates in the accelerating direction, its rotational force is transmitted via the chain 193 to the rear sprocket 192 in the accelerating direction, thus causing the rear sprocket 192 and the rear wheel 112 to turn in the accelerating direction. This propels the electric bicycle 1 in the traveling direction.

Optionally, while the electric bicycle 1 is propelled by the human driving force in the traveling direction, the rotational force applied from the motor 5 may be applied as auxiliary driving force to the output body 8. This option will be described in detail below. As the rotary shaft 51 of the motor 5 rotates in the accelerating direction, the first transmission gear 311 meshing with the rotary shaft 51 of the motor 5 turns in the accelerating direction. The rotational force of the first transmission gear 311 in the accelerating direction is transmitted via the one-way clutch 315 to the transmission rotary shaft 310 and the second transmission gear 312 fixed to the transmission rotary shaft 310, thus causing the second transmission gear 312 to turn in the accelerating direction. The rotational force of the second transmission gear 312 in the accelerating direction is transmitted to the output body 8 meshing with the second transmission gear 312. That is to say, the output body 8 serves as a resultant force body in which the human driving force applied from the input body 7 and the rotational force applied from the motor 5 are combined with each other. The motor unit 3 according to the first embodiment is a so-called "uniaxial motor unit 3."

Next, a situation where the motor 5 is not driven while the electric bicycle 1 is propelled by the human driving force in the traveling direction will be described. In that case, the output body 8 is rotating in the accelerating direction, and therefore, the second transmission gear 312 and transmission rotary shaft 310 meshing with the output body 8 rotate in the accelerating direction. However, the rotational force of the transmission rotary shaft 310 in the accelerating direction is not transmitted by the one-way clutch 315 to the first transmission gear 311. This may prevent the rotary shaft 51 and the rotor 52 from rotating when the motor 5 is not driven.

In the electric bicycle 1, the rotational force applied from the motor 5 is controlled according to the torque applied to the input shaft 6 and the number of revolutions of the input shaft 6 per unit time. The torque applied to the input shaft 6 is detected by a torque detection unit 33. The torque detection unit 33 is disposed in a range in the axial direction 60 and along the outer peripheral surface of the rotary shaft unit 30.

In the first embodiment, a magnetostriction generation unit 331 to which magnetic anisotropy is applied is provided on the outer peripheral surface of the first input body 71. In addition, a coil 332 is arranged to be spaced by a certain distance from the region, where the magnetostriction generation unit 331 is provided, on the outer peripheral surface of the first input body 71. The magnetostriction generation unit 331 and the coil 332 together form a magnetostrictive torque sensor serving as the torque detection unit 33. Any of various types of sensors may be used as appropriate as such a magnetostrictive torque sensor. The torque detection unit 33 does not have to be a magnetostrictive torque sensor, either. The torque detection unit 33 is provided, in the axial direction 60, on the left of the first transmission gear 311, the second transmission gear 312, the one-way clutch 32, and the second bearing 46.

The number of revolutions of the input shaft 6 per unit time is detected by a rotation detection unit 34. The rotation detection unit 34 is disposed in a range in the axial direction 60 and along the outer peripheral surface of the rotary shaft unit 30.

In the first embodiment, a rotator 341, including teeth and light transmitting portions between the teeth which are arranged at regular intervals in the circumferential direction, is fixed on the outer peripheral surface of the input body 7 and on the right of the coil 332 of the torque detection unit 33. The first rotator 341 is provided to rotate along with the input body 7. In addition, an optical sensor 342 is provided to interpose the teeth of the rotator 341 in the rightward/leftward direction. The optical sensor 342 includes a light emerging portion 343 provided on the left of the teeth and a light receiving portion 344 provided on the right of the teeth. These relative positions of the light emerging portion 343 and the light receiving portion 344 are only examples and should not be construed as limiting. Any of various types may be used as appropriate as the rotation detection unit 34 including the rotator 341 and the optical sensor 342. In addition, the rotation detection unit 34 does not have to include the rotator 341 and the optical sensor 342.

The rotation detection unit 34 is located, in the axial direction 60, at the same position as the first transmission gear 311 and disposed on the left of the second transmission gear 312, the one-way clutch 32, and the second bearing 46. As used herein, if one member is "located at the same position in the axial direction 60" as another member, this refers to a state where the two members overlap at least partially with each other when viewed in a direction perpendicular to the axial direction.

The motor unit 3 includes, inside the case 4, a control board 35 including a control unit for controlling the motor 5. The control unit may include, for example, a microcomputer and execute a program stored in a storage unit such as a read-only memory (ROM) to control the operations of respective elements. Any of various types of control units may be used as appropriate as such a control unit and detailed description thereof will be omitted herein. The control unit controls the rotational force applied from the motor 5 based on the torque detected by the torque detection unit 33 and the number of revolutions detected by the rotation detection unit 34.

As shown in FIGS. 13A and 13B, the control board 35 is arranged in an upper part inside the case 4.

The control board 35 includes a plurality of electrical components 353 mounted thereon. The plurality of electrical components 353 includes not only capacitors 3532 and integrated circuits (hall ICs) 3533, for example, but also heat-generating elements 3531 that tend to generate heat particularly easily. Examples of the heat-generating elements 3531 include not only switching elements such as FETs, diodes, and coils that supply power to the motor 5 but also various types of resistors and connectors as well.

The second divided part 42 of the case 4 includes a heat-dissipating portion 424 as an integral part thereof. The heat-dissipating portion 424 is connected to the control board 35 via a thermally conductive sheet 92. The heat generated from the plurality of heat-generating elements 3531 is efficiently dissipated from the outer surface of the case 4 via the heat-dissipating portion 424.

Also, as shown in FIG. 7, the control board 35 is arranged, in the axial direction 60, on the right of the stator 53 of the motor 5. In addition, the control board 35 is located at the same position in the axial direction 60 as the first transmission gear 311 and is disposed, in the axial direction 60, on the left of the second transmission gear 312, the one-way clutch 32, and the second bearing 46.

The motor unit 3 includes a third bearing 47 located between the first bearing 45 and the second bearing 46 in the axial direction 60. The third bearing 47 rotatably supports the input body 7. In the first embodiment, the third bearing 47 is configured as a ball bearing. Note that the third bearing 47 does not have to be a ball bearing but may also be configured as a roller bearing or any of various other types of bearings.

Providing the third bearing 47 stabilizes the rotation of the rotary shaft unit 30. That is to say, without the third bearing 47, the rotary shaft unit 30 would be supported by only the two bearings, namely, the first bearing 45 and the second bearing 46. In that case, the part, located between the first bearing 45 and the second bearing 46, of the rotary shaft unit 30 would tend to shake along the radius of the shaft. In contrast, providing the third bearing 47 allows the part between the first bearing 45 and the second bearing 46 to be supported from outside of the radius of the shaft, thus reducing the chances of the output body 8 and the rotary shaft unit 30 including the output body 8 being shaken along the radius of the shaft. This stabilizes the rotation of the rotary shaft unit 30. As the rotation of the rotary shaft unit 30 is stabilized, the rotation of the front sprocket 191 is also stabilized, thus reducing the chances of the chain 193 hung around the front sprocket 191 falling off the front sprocket 191.

In the first embodiment, the third bearing 47 supports the second input body 72. Making the third bearing 47 support the second input body 72, not the first input body 71, allows a portion, adjacent to the output body 8 to which force is applied from the speed reducer mechanism 31, to be supported, thus further stabilizing the rotation of the rotary shaft unit 30.

In addition, in the first embodiment, the third bearing 47 is located between the input body 7 (second input body 72) and the output body 8 which overlap with each other in the radial direction for the input shaft 6. This allows the third bearing 47 to be supported by the output body 8, thus eliminating the need to attach the third bearing 47 to the case 4.

Furthermore, in the first embodiment, both the third bearing 47 and the one-way clutch 32 are located between the input body 7 (second input body 72) and the output body 8, which overlap with each other in the radial direction. The third bearing 47 and the one-way clutch 32 are located at different positions in the axial direction 60. Specifically, the third bearing 47 is located on the left and the one-way clutch 32 is located on the right. In other words, the one-way clutch 32 is located between the second bearing 46 and the third bearing 47 in the axial direction 60 for the input shaft 6. Thus, the one-way clutch 32 that is the source of producing vibrations and noise is interposed between the second bearing 46 and the third bearing 47 in the axial direction 60, thus reducing the chances of the input body 7 and the rotary shaft unit 30, including the input body 7, being shaken along the radius of the shaft. Consequently, the rotation of the rotary shaft unit 30 is further stabilized.

Furthermore, the third bearing 47 is located between the one-way clutch 32 and the torque detection unit 33 in the axial direction 60. Thus, in the axial direction 60, the torque detection unit 33 is located between the first bearing 45 and the third bearing 47 and the one-way clutch 32 is located between the third bearing 47 and the second bearing 46. This reduces the shake of portions, where the torque detection unit 33 and the one-way clutch 32 are located, respectively, of the rotary shaft unit 30, along the radius of the shaft.

A sealant 36 such as an O-ring is interposed between the one-way clutch 32 and the third bearing 47. Providing the sealant 36 reduces the leakage of the grease supplied to the third bearing 47. In particular, in the first embodiment, the one-way clutch 32 is surrounded with the second input body 72, the output body 8, and the sealant 36, thus reducing the leakage of the grease supplied to the one-way clutch 32 and also preventing water from entering the motor unit 3. The sealant 36 may also be a D-ring, for example, instead of the O-ring, or any other type of ring without limitation.

Furthermore, in the first embodiment, the second bearing 46 and the third bearing 47 support the output body 8. The second bearing 46 is disposed on the case 4 to support output body 8 from outside in the radial direction. The third bearing 47 is disposed on the second input body 72 to support the output body 8 from inside in the radial direction. That is to say, the output body 8 is supported from both outside and inside in the radial direction, thus reducing the shake of the output body 8 itself and the rotary shaft unit 30 including the output body 8 along the radius of the shaft. As a result, the rotation of the rotary shaft unit 30 is further stabilized.

Furthermore, in the first embodiment, the control board 35 is located, in the axial direction 60, between the rotor 52 of the motor 5 and the third bearing 47. This contributes to reducing the size of the motor unit 3 more effectively.

Furthermore, in the first embodiment, the third bearing 47 is located, in the axial direction 60, between the rotary shaft supporting bearing 551 and the stator 53. This contributes to reducing the size of the motor unit 3 more effectively.

Furthermore, in the first embodiment, at least part of the rim 82 is located, in the axial direction 60, between the second bearing 46 and the third bearing 47. This allows at least the part of the rim 82 to be located in the region where the shake of the rotary shaft unit 30 along the radius of the shaft is easily reducible, thus stabilizing meshing with the second transmission gear 312.

Furthermore, in the first embodiment, the web 81 is located, in the axial direction 60, between the second bearing 46 and the third bearing 47. This allows the web 81 to be located in the region where the shake of the rotary shaft unit 30 along the radius of the shaft is easily reducible, thus stabilizing meshing with the second transmission gear 312.

Furthermore, in the first embodiment, the third bearing 47 is located at the same position in the axial direction 60 as the second transmission gear 312. This allows the web 81 to be located in the region where the shake of the rotary shaft unit 30 along the radius of the shaft is easily reducible, thus stabilizing meshing with the second transmission gear 312.

Figure 14:
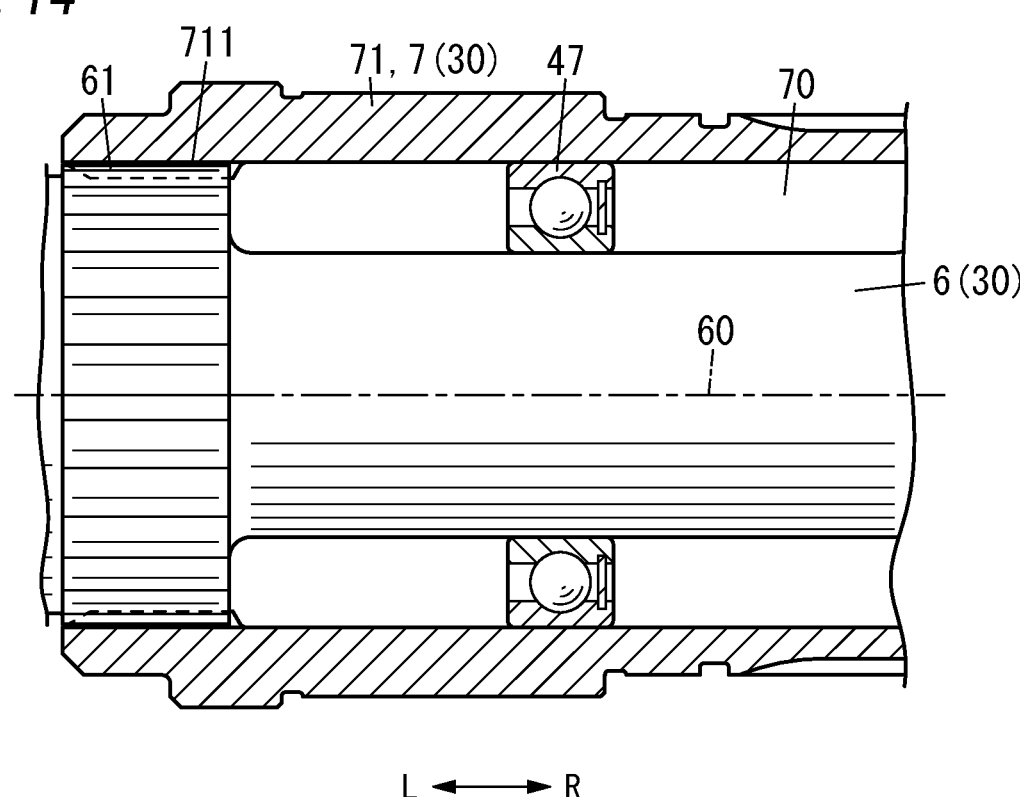
FIG. 14 is a partial cross-sectional view of a motor unit according to a variation of the exemplary embodiment.

Alternatively, the third bearing 47 may support the first input body 71 as shown in FIG. 14. The third bearing 47 is disposed in the gap 70 between the input shaft 6 and the first input body 71, thus making it easier to reduce the shake of the first input body 71 along the radius of the shaft.

Figure 15:
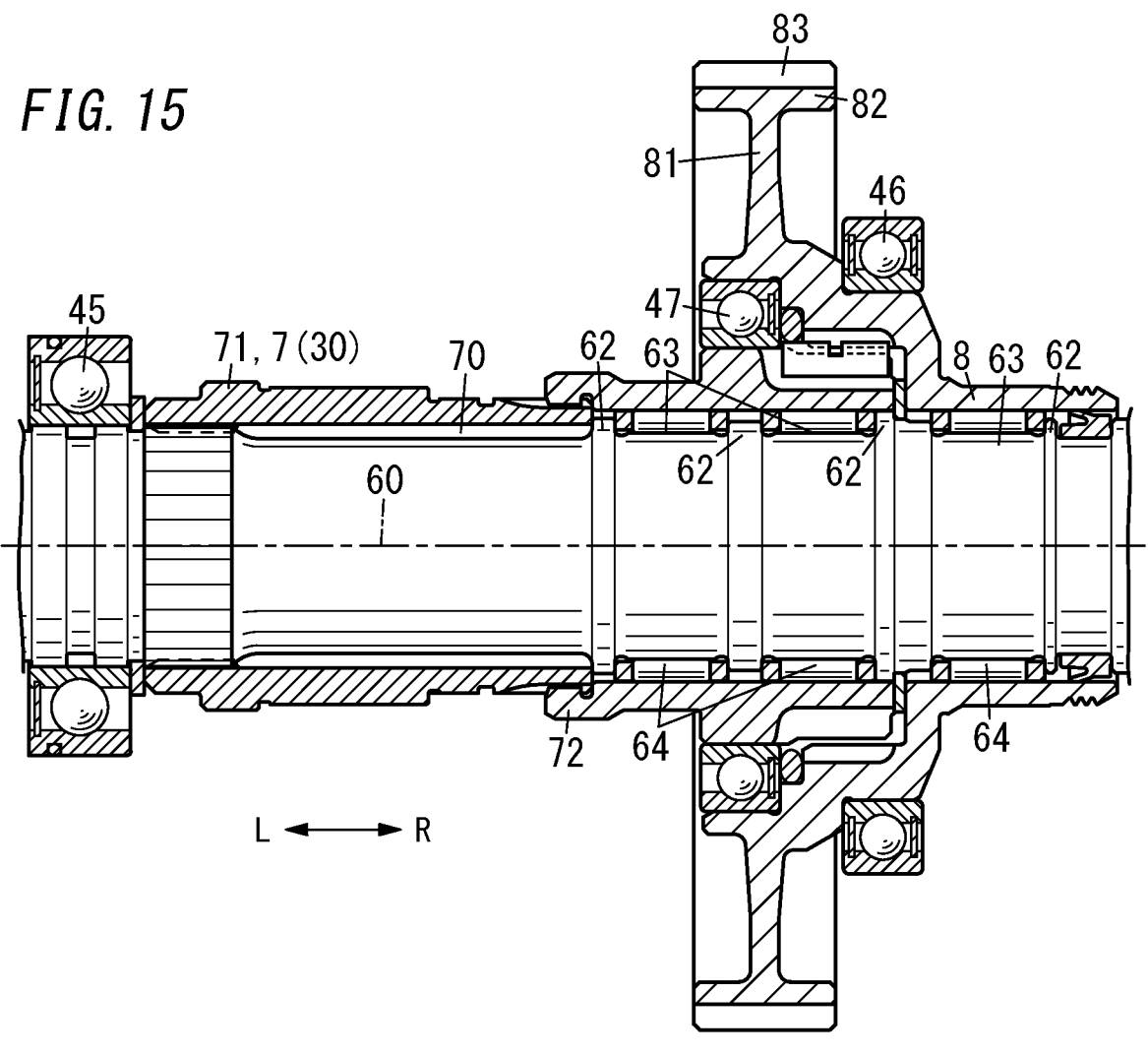
FIG. 15 is a cross-sectional view of a case including a rotary shaft unit and first to third bearings according to the exemplary embodiment.

Next, the input shaft 6 will be described in further detail. As shown in FIG. 15, the input shaft 6 includes a first part 62, which is located in a range in the axial direction 60 and has a first shaft diameter, and a second part 63 having a second shaft diameter that is smaller than the first shaft diameter. The second part 63 is located in a different region in the axial direction 60 from the first part 62.

A bearing 64 is attached to the outer peripheral surface of the second part 63. The bearing 64 either has a cylindrical body with a bush roller or a needle roller or a needle full-complement roller bearing.

In the first embodiment, the bearing 64 supports the input body 7. Note that although the bearing 64 supports the second input body 72 in the first embodiment, the bearing 64 may support the first input body 71 instead. Having the input body 7 supported by the bearing 64 reduces the shake of the input body 7 along the radius of the shaft, thus stabilizing the rotation of the rotary shaft unit 30.

Figure 16:
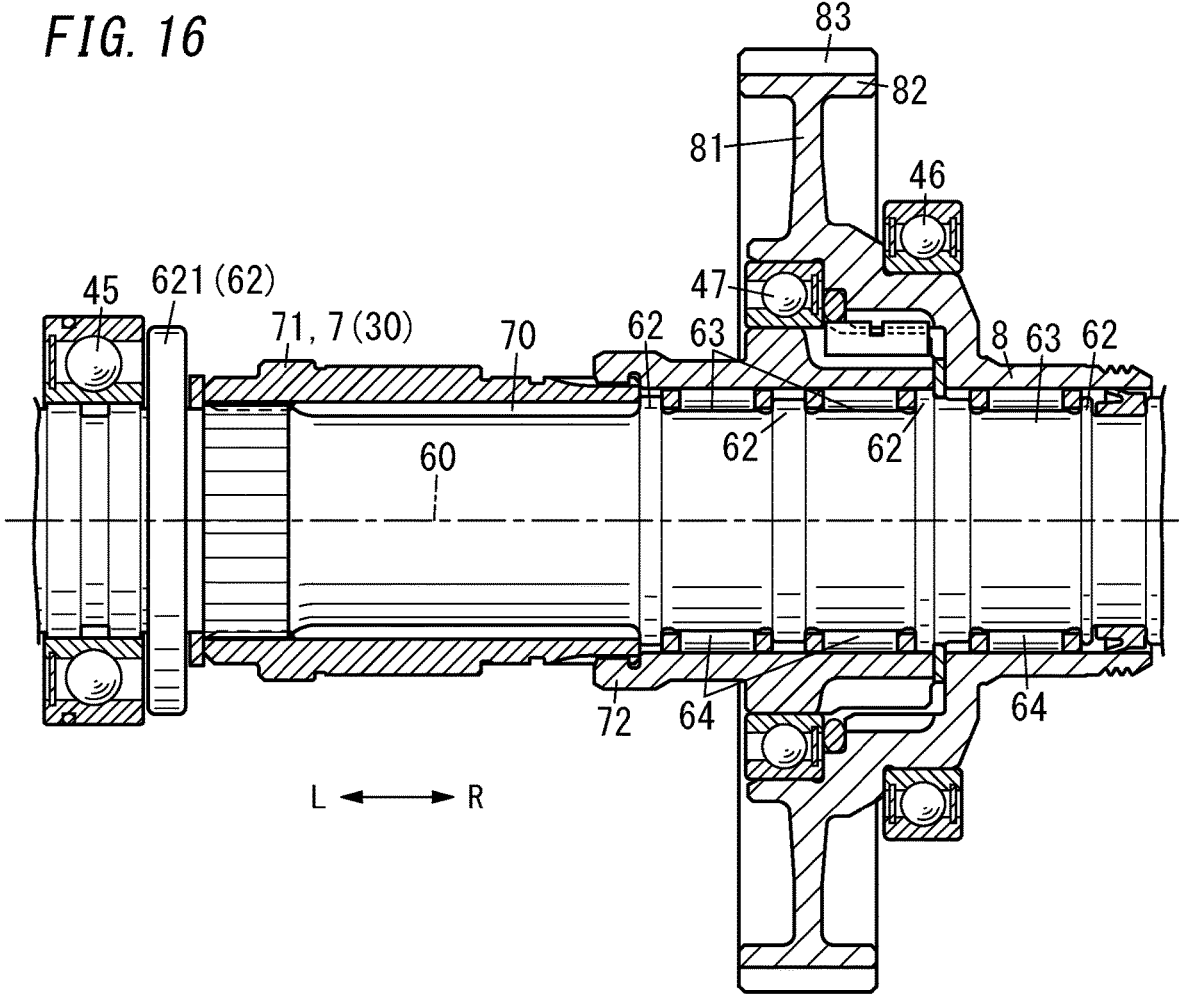
FIG. 16 is a cross-sectional view of a case including a rotary shaft unit and first to third bearings according to a variation of the exemplary embodiment.

FIG. 16 illustrates a variation of the rotary shaft unit 30. In this variation, the input shaft 6 includes a flange 621 as the first part 62. In that case, even if one attempts to move the inseparable bearing from the left end portion of the input shaft 6 to the second part 63, the flange 621 prevents the bearing from moving any longer. The bearing 64 is effective in such a situation.

Figure 17:
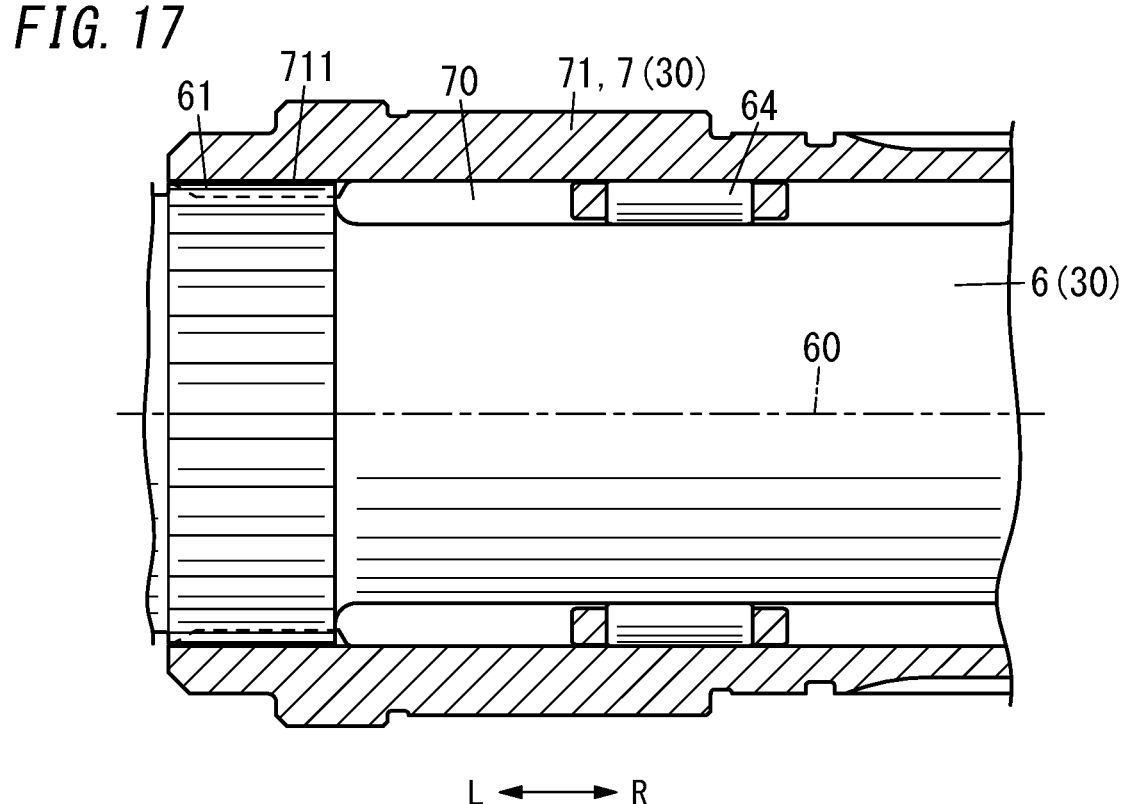
FIG. 17 is a partial cross-sectional view of a motor unit according to a variation of the exemplary embodiment.

Alternatively, the bearing 64 may support the first input body 71 as shown in FIG. 17. The bearing 64 is disposed in the gap 70 between the input shaft 6 and the first input body 71, thus making it easier to reduce the shake of the first input body 71 along the radius of the shaft.

Next, the bracket 2 and the case 4 will be described in further detail. As shown in FIGS. 4A-5C, the first side piece 22 of the bracket 2 has a bolt hole 221 to allow a bolt of a fastening member 14 to pass therethrough and the second side piece 23 thereof has a bolt hole 231 to allow a bolt of the fastening member 14 to pass therethrough.

As shown in FIGS. 8A-9B, the first divided part 41 includes a plurality of first attachment pieces 401. The first divided part 41 also includes one of second attachment pieces 402. Each of the first attachment pieces 401 has a bolt hole 403 to allow a bolt of the fastening member 14 to pass therethrough. As shown in FIGS. 10A-10C, the second divided part 42 has the second attachment pieces 402. Each of the second attachment pieces 402 has a bolt hole 404 to allow a bolt of the fastening member 14 to pass therethrough.

As shown in FIGS. 6, 12A, and 12B, the first attachment pieces 401 of the case 4 are fastened to the first side piece 22 with the fastening members 14 and the second attachment pieces 402 of the case 4 are fastened to the second side piece 23 with the fastening members 14. As shown in FIG. 6, the space left over the case 4 and under the bracket 2 in a state where the case 4 is fastened to the bracket 2 with fastening members 14 serves as the cabling space 20 that allows the cables 163 and the shift cable 17 to pass therethrough.

In the first embodiment, a buffer 38 is interposed between each of the first attachment pieces 401 and the first side piece 22 or between each of the second attachment pieces 402 and the second side piece 23. The buffer 38 includes a sleeve 381 and a flange 382. The buffer 38 is made of a different material from the case 4 and the bracket 2.

Each sleeve 381 may be inserted into either the bolt hole 403 of an associated one of the first attachment pieces 401 or an associated one of the bolt holes 221 of the first side piece 22. Alternatively, each sleeve 381 may be inserted into either the bolt hole 404 of an associated one of the second attachment pieces 402 or an associated one of the bolt holes 231 of the second side piece 23. In the first embodiment, the sleeves 381 are inserted into the first attachment pieces 401. Each flange 382 protrudes in a brim shape from an associated one of the sleeves 381 and is interposed between an associated one of the first attachment pieces 401 and the first side piece 22.

If the case 4 and the bracket 2 are made of aluminum, then the buffer 38 is made of a metal other than aluminum (e.g., stainless steel) or a resin, for example. Alternatively, if the case 4 and the bracket 2 are made of stainless steel, then the buffer 38 is made of a metal other than stainless steel (e.g., aluminum) or a resin, for example.

Interposing, between the case 4 and the bracket 2, the buffer 38 made of a different material from the case 4 and the bracket 2 reduces the chances of variations being transmitted between the case 4 and the bracket 2.

Figure 18:
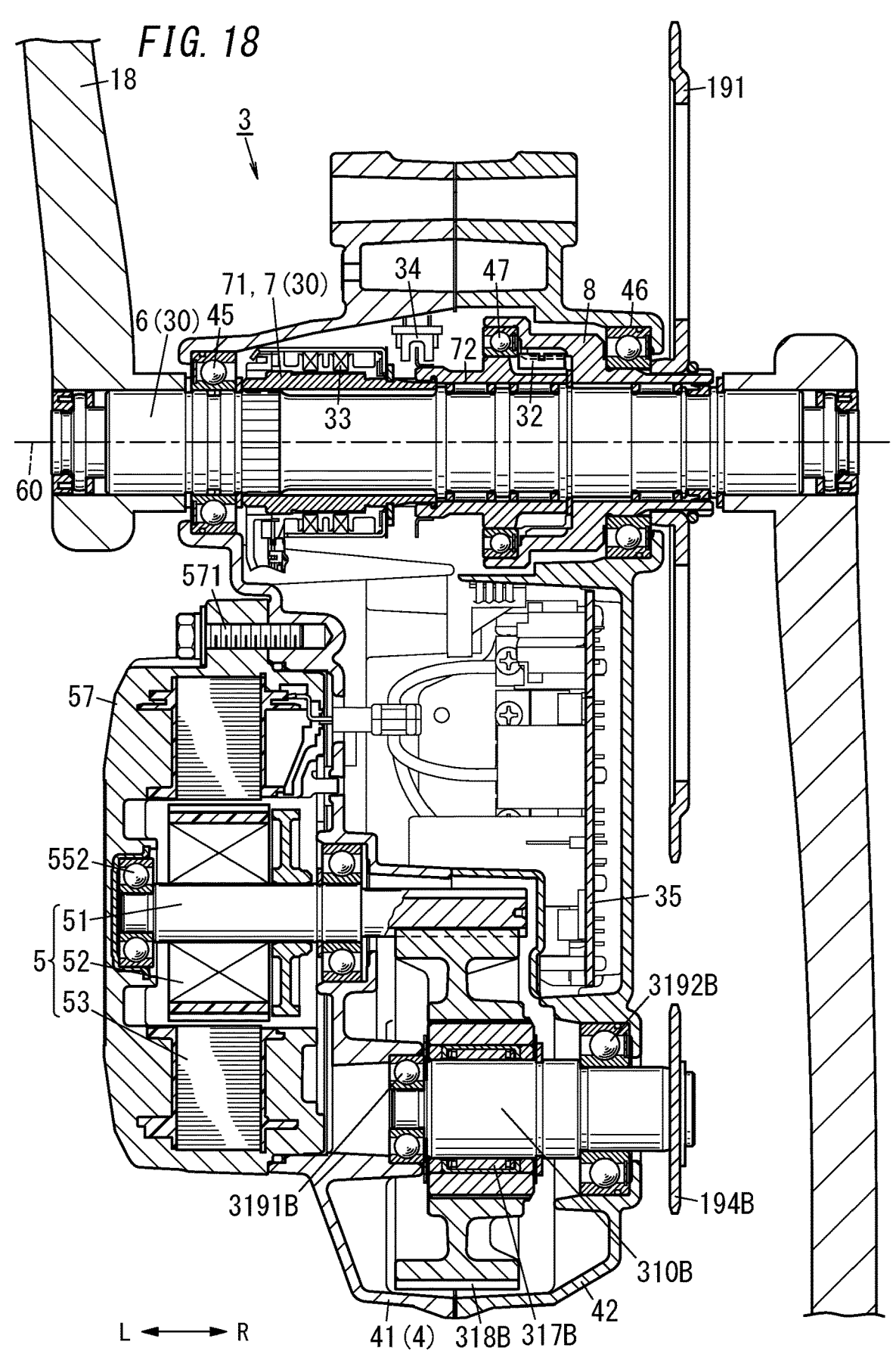
FIG. 18 is a cross-sectional view of the motor unit as taken along planes that respectively pass through an input shaft of a motor unit according to a second embodiment, a rotary shaft of its motor, and an axis of a transmission rotary shaft of a speed reducer mechanism.

Next, a motor unit 3 according to a second embodiment will be described with reference to FIG. 18. Note that the motor unit 3 according to the second embodiment is mostly the same as the motor unit 3 according to the first embodiment. Thus, the following description of the second embodiment will be focused on differences from the first embodiment.

The motor unit 3 according to the first embodiment is a so-called "uniaxial motor unit 3."
On the other hand, the motor unit 3 according to the second embodiment is a so-called "biaxial motor unit 3," which is a major difference from the first embodiment.

The output body 8 that forms part of the rotary shaft unit 30 will be hereinafter referred to as a "first output body." The motor unit 3 includes a second output body 310B provided separately from the first output body 8. One end portion (e.g., the left end in the second embodiment) of the second output body 310B in the axial direction is located inside the case 4 and supported rotatably by a bearing 3191B disposed in the first divided part 41. The other end portion (e.g., the right end portion in the second embodiment) of the second output body 310B in the axial direction is supported rotatably by a bearing 3192B disposed in the second divided part 42. The right end portion is located outside of the case 4. To the right end portion of the second output body 310B, a sprocket 194B is fixed to rotate along with the second output body 310B. The chain 193 to be hung around the front sprocket 191 is hung around the sprocket 194B.

To the outer peripheral surface of the second output body 310B, teeth 318B with a large diameter to mesh with the teeth 54 of the rotary shaft 51 of the motor 5 are attached via a one-way clutch 317B.

As the rotary shaft 51 of the motor 5 rotates in the accelerating direction while the electric bicycle 1 is propelled in the traveling direction by the human driving force, the teeth 318B meshing with the rotary shaft 51 of the motor 5 also turn in the accelerating direction. The rotational force of the teeth 318B in the accelerating direction is transmitted to the second output body 310B via the one-way clutch 317B, and then applied to the chain 193.

Meanwhile, unless the motor 5 is driven while the electric bicycle 1 is propelled in the traveling direction by the human driving force, the second output body 310B rotates in the accelerating direction but the rotational force produced in the accelerating direction by the second output body 310B is not transmitted by the one-way clutch 317B to the rotary shaft 51 of the motor 5. This prevents the rotary shaft 51 and the rotor 52 from rotating when the motor 5 is not driven.

As is clear from the foregoing description of the first embodiment, the second embodiment, and their variations, a motor unit 3 according to a first aspect includes a case (4), a motor (5) having a rotary shaft (51) housed in the case (4), an input shaft (6), an input body (7), an output body (8), and a speed reducer mechanism (31). The input shaft (6) penetrates through the case (4) in an axial direction (60) and is arranged to be rotatable around an axis (60) defining the axial direction (60). The input body (7) is disposed along an outer peripheral surface of the input shaft (6) and rotates along with the input shaft (6). The output body (8) is arranged along the outer peripheral surface of the input shaft (6) to be rotatable around the axis (60) and receives rotational force from the input body (7). The speed reducer mechanism (31) is housed in the case (4) and reduces a rotational speed of the motor (5) and transmits rotational force with the rotational speed thus reduced.

The case (4) includes a first bearing (45), a second bearing (46), and a third bearing (47). The first bearing (45) is located at one end in the axial direction (60) and supports a rotary shaft unit (30) rotatably. The rotary shaft unit (30) includes the input shaft (6), the input body (7), and the output body (8). The second bearing (46) is located at the other end in the axial direction (60) and supports the rotary shaft unit (30) rotatably. The third bearing (47) is located between the first bearing (45) and the second bearing (46) in the axial direction (60) and supports at least one of the input body (7) or the output body (8) rotatably.

The first aspect stabilizes the rotation of the rotary shaft unit (30) by providing the third bearing (47). Specifically, unless the third bearing (47) is provided, the rotary shaft unit (30) would be supported by only the two bearings, namely, the first bearing (45) and the second bearing (46). In that case, a part, located between the first bearing (45) and the second bearing (46), of the rotary shaft unit (30) would tend to shake along the radius of the shaft. On the other hand, providing the third bearing (47) allows the part between the first bearing (45) and the second bearing (46) to be supported from the outside of the shaft, thus reducing the shake of the output body (8) and the rotary shaft unit (30), including the output body (8), along the radius of the shaft. This stabilizes the rotation of the rotary shaft unit (30).

A motor unit (3) according to a second aspect may be implemented in combination with the first aspect. In the second aspect, the motor unit (3) further includes a one-way clutch (32) interposed between the input body (7) and the output body (8).

The second aspect allows, only when rotational force is applied to the input body (7) in such a direction as to accelerate the electric bicycle (1) in its traveling direction, the rotational force to be transmitted to the output body (8).

A motor unit (3) according to a third aspect may be implemented in combination with the second aspect. In the third aspect, the one-way clutch (32) is located between the second bearing (46) and the third bearing (47) in the axial direction (60).

According to the third aspect, a web (81) is located in a region where the shake of the rotary shaft unit (30) along the radius of the shaft may be reduced easily, thus stabilizing meshing with the second transmission gear (312).

A motor unit (3) according to a fourth aspect may be implemented in combination with the second or third aspect. In the fourth aspect, the second bearing (46) supports the output body (8), and the third bearing (47) supports the input body (7).

The fourth aspect allows the output body (8) to be supported by the second bearing (46) and also allows the input body (7) to be supported by the third bearing (47).

A motor unit (3) according to a fifth aspect may be implemented in combination with the fourth aspect. In the fifth aspect, in a range in the axial direction (60), the input body (7) and the output body (8) overlap with each other in a radial direction of the input shaft (6). The third bearing

(47) is located, in the range in the axial direction (60), between the input body (7) and the output body (8) that overlap with each other in the radial direction.

The fifth aspect allows the third bearing (47) to be supported by the output body (8) and eliminates the need to attach the third bearing (47) to the case (4).

A motor unit (3) according to the sixth aspect may be implemented in combination with the fifth aspect. In the sixth aspect, the one-way clutch (32) is located between the input body (7) and the output body (8) that overlap with each other in the radial direction and at a different position in the axial direction (60) from the third bearing (47). The case (4) further includes a sealant (36) interposed between the one-way clutch (32) and the third bearing (47).

The sixth aspect reduces the leakage of grease supplied to the third bearing (47).

A motor unit (3) according to a seventh aspect may be implemented in combination with any one of the fourth to sixth aspects. In the seventh aspect, the input body (7) includes: a first input body (71) coupled to the input shaft (6); and a second input body (72) located at a different position in the axial direction (60) from the first input body (71), coupled to the first input body (71), and transmitting the rotational force to the output body (8). The third bearing (47) supports the first input body (71).

The seventh aspect allows the first input body (71) to be supported by the third bearing (47).

A motor unit (3) according to an eighth aspect may be implemented in combination with the second or third aspect. In the eighth aspect, the second bearing (46) and the third bearing (47) support the output body (8).

The eighth aspect allows the output body (8) to be supported by the second bearing (46) and the third bearing (47).

A motor unit (3) according to a ninth aspect may be implemented in combination with any one of the second to eighth aspects. In the ninth aspect, the second bearing (46) overlaps, in a range in the axial direction (60), with the one-way clutch (32) in the radial direction of the input shaft (6).

The ninth aspect allows the one-way clutch (32) and the input shaft (6) to be supported with more reliability by the second bearing (46).

A motor unit (3) according to the tenth aspect may be implemented in combination with the ninth aspect. In the tenth aspect, the second bearing (46) is located outside of the one-way clutch (32) in the radial direction.

The tenth aspect allows the one-way clutch (32) to be supported by the first bearing (45) and the second bearing (46).

A motor unit (3) according to an eleventh aspect may be implemented in combination with any one of the second to tenth aspects. In the eleventh aspect, the motor unit (3) includes a torque detection unit (33) that detects a torque applied to the input shaft (6) in a range in the axial direction (60) and along an outer peripheral surface of the rotary shaft unit (30). The third bearing (47) is located between the one-way clutch (32) and the torque detection unit (33) in the axial direction (60).

According to the eleventh aspect, the shake of portions, where the torque detection unit (33) and the one-way clutch (32) are respectively located, of the rotary shaft unit (30) may be reduced along the radius of the shaft.

A motor unit (3) according to a twelfth aspect may be implemented in combination with any one of the first to eleventh aspects. In the twelfth aspect, the motor unit (3) further includes a control board (35) arranged in the case (4)

to control the motor (5). The control board (35) is located between a rotor (52) of the motor (5) and the third bearing (47) in the axial direction (60).

The twelfth aspect facilitates reducing the overall size of the motor unit (3).

A motor unit (3) according to a thirteenth aspect may be implemented in combination with any one of the first to twelfth aspects. In the thirteenth aspect, the motor unit (3) further includes a rotary shaft supporting bearing (551) that supports an end portion, protruding from a stator (53), of the rotary shaft (51) of the motor. The third bearing (47) is located between the rotary shaft supporting bearing (551) and the stator (53) in the axial direction (60).

The thirteenth aspect facilitates reducing the overall size of the motor unit (3).

A motor unit (3) according to a fourteenth aspect may be implemented in combination with any one of the first to thirteenth aspects. In the fourteenth aspect, at least one of the first bearing (45), the second bearing (46), or the third bearing (47) is a ball bearing.

The fourteenth aspect allows the rotary shaft unit (30) to rotate smoothly.

A motor unit (3) according to a fifteenth aspect may be implemented in combination with any one of the first to fourteenth aspects. In the fifteenth aspect, the speed reducer mechanism (31) reduces the rotational speed of the motor (5) and transmits the rotational force with the rotational speed thus reduced to the output body (8).

The fifteenth aspect enables stabilizing the rotation of the rotary shaft unit (30) in a so-called "uniaxial" motor unit (3).

A motor unit (3) according to a sixteenth aspect may be implemented in combination with the fifteenth aspect. In the sixteenth aspect, the output body (8) includes, in a range in the axial direction (60), a web (81) and a rim (82). The web (81) protrudes outward in the radial direction of the input shaft (6). The rim (82) is continuous with an outer end portion of the web (81) in the radial direction. The length of the rim (82) as measured in the axial direction (60) is greater than the length of the web (81) as measured in the axial direction (60). The rim (82) has, on an outer peripheral surface thereof, a plurality of teeth (83) meshing with the speed reducer mechanism (31).

According to the sixteenth aspect, the output body (8) is formed by the web (81), the rim (82), and the plurality of teeth (83).

A motor unit (3) according to a seventeenth aspect may be implemented in combination with the sixteenth aspect. In the seventeenth aspect, at least part of the rim (82) is located between the second bearing (46) and the third bearing (47) in the axial direction (60).

According to the seventeenth aspect, the one-way clutch (32), which is a source of vibration and noise, is interposed between the second bearing (46) and the third bearing (47) in the axial direction (60), thus reducing the shake of the input body (7) and the rotary shaft unit (30), including the input body (7), along the radius of the shaft. Consequently, this further stabilizes the rotation of the rotary shaft unit (30).

A motor unit (3) according to an eighteenth aspect may be implemented in combination with the seventeenth aspect. In the eighteenth aspect, the web (81) is located between the second bearing (46) and the third bearing (47) in the axial direction (60).

According to the eighteenth aspect, the web (81) is located in a region, where the shake along the radius of the shaft may be reduced easily, of the rotary shaft unit (30), thus stabilizing meshing with the second transmission gear (312).

A motor unit (3) according to a nineteenth aspect may be implemented in combination with the seventeenth or eighteenth aspect. In the nineteenth aspect, the input body (7) includes: a first input body (71) coupled to the input shaft (6); and a second input body (72) located at a different position in the axial direction (60) from the first input body (71), fitted into the first input body (71), and transmitting the rotational force to the output body (8). A fitting portion (712), (721) in which the first input body (71) and the second input body (72) are fitted into each other is located at a different position in the axial direction (60) from the rim (82).

A motor unit (3) according to a twentieth aspect may be implemented in combination with any one of the seventeenth to nineteenth aspects. In the twentieth aspect, the speed reducer mechanism (31) includes a first transmission gear (311) and a second transmission gear (312). The first transmission gear (311) turns with the rotational force applied from the rotary shaft (51) of the motor (5). The second transmission gear (312) is located at a different position in the axial direction (60) from the first transmission gear (311) and receives the rotational force from the first transmission gear (311) and transmits the rotational force to the teeth. The third bearing (47) is located at the same position in the axial direction (60) as the second transmission gear (312).

According to the twentieth aspect, the web (81) is located in a region, where the shake along the radius of the shaft may be reduced easily, of the rotary shaft unit (30), thus stabilizing meshing with the second transmission gear (312).

An electric bicycle (1) according to a twenty-first aspect is implemented in combination with any one of the first to twentieth aspects. The electric bicycle (1) according to the twenty-first aspect includes the motor unit (3) according to any one of the first to twentieth aspects.

The twenty-first aspect provides an electric bicycle (1) designed to stabilize the rotation of its rotary shaft unit (30).

| Reference Signs List | |
|---|---|
| 1 | Electric Bicycle |
| 3 | Motor Unit |
| 4 | Case |
| 5 | Motor |
| 6 | Input Shaft |
| 7 | Input Body |
| 8 | Output Body |
| 30 | Rotary Shaft Unit |
| 31 | Speed Reducer Mechanism |
| 311 | First Transmission Gear |
| 312 | Second Transmission Gear |
| 32 | One-Way Clutch |
| 33 | Torque Detection Unit |
| 35 | Control Board |
| 36 | Sealant |
| 45 | First Bearing |
| 46 | Second Bearing |
| 47 | Third Bearing |
| 51 | Rotary Shaft |
| 52 | Rotor |
| 53 | Stator |
| 60 | Axis |
| 71 | First Input Body |
| 712 | Fitting Portion |
| 72 | Second Input Body |

-continued

| Reference Signs List | |
|---|---|
| 81 | Web |
| 82 | Rim |
| 83 | Tooth |

The invention claimed is:

1. A motor unit comprising:

a case;

a motor having a rotary shaft housed in the case;

an input shaft penetrating through the case in an axial direction and arranged to be rotatable around an axis defining the axial direction;

an input body disposed along an outer peripheral surface of the input shaft and configured to rotate along with the input shaft;

an output body arranged along the outer peripheral surface of the input shaft to be rotatable around the axis and configured to receive rotational force from the input body; and a speed reducer mechanism housed in the case and configured to reduce a rotational speed of the motor and transmit rotational force with the rotational speed thus reduced, the case including:

a first bearing located at one end in the axial direction and supporting a rotary shaft unit rotatably, the rotary shaft unit including the input shaft, the input body, and the output body;

a second bearing located at the other end in the axial direction and supporting the rotary shaft unit rotatably; and a third bearing located between the first bearing and the second bearing in the axial direction and supporting at least one of the input body or the output body rotatably, the speed reducer mechanism being configured to reduce the rotational speed of the motor and transmit the rotational force with the rotational speed thus reduced to the output body, the output body including, in a range in the axial direction:

a web protruding outward in the radial direction of the input shaft; and a rim continuous with an outer end portion of the web in the radial direction, a length of the rim as measured in the axial direction being greater than a length of the web as measured in the axial direction, the rim having, on an outer peripheral surface thereof, a plurality of teeth meshing with the speed reducer mechanism, at least part of the rim being located between the second bearing and the third bearing in the axial direction, the speed reducer mechanism including:

a first transmission gear configured to turn with the rotational force applied from the rotary shaft of the motor; and a second transmission gear located at a different position in the axial direction from the first transmission gear and configured to receive the rotational force from the first transmission gear and transmit the rotational force to the plurality of teeth, and at least part of the third bearing being located at the same position in the axial direction as the second transmission gear.

2. The motor unit of claim 1, further comprising a gear interposed between the first transmision gear and the rotary shaft of the motor, wherein the gear meshes with teeth provided on an outer surface of the rotary shaft.

3. The motor unit of claim 1, further comprising a one-way clutch interposed between the input body and the output body.

4. The motor unit of claim 3, wherein the one-way clutch is located between the second bearing and the third bearing in the axial direction.

5. The motor unit of claim 3, wherein the second bearing supports the output body, and the third bearing supports the input body.

6. The motor unit of claim 5, wherein in a range in the axial direction, the input body and the output body overlap with each other in a radial direction of the input shaft, and the third bearing is located, in the region in the axial direction, between the input body and the output body that overlap with each other in the radial direction.

7. The motor unit of claim 6, wherein the one-way clutch is located between the input body and the output body that overlap with each other in the radial direction and at a different position in the axial direction from the third bearing, and the case further includes a sealant interposed between the one-way clutch and the third bearing.

8. The motor unit of claim 5, wherein the input body includes:

a first input body coupled to the input shaft; and a second input body located at a different position in the axial direction from the first input body, coupled to the first input body, and configured to transmit the rotational force to the output body, and the third bearing supports the first input body.

9. The motor unit of claim 3, wherein the second bearing and the third bearing support the output body.

10. The motor unit of claim 3, wherein the second bearing overlaps, in a range in the axial direction, with the one-way clutch in the radial direction of the input shaft.

11. The motor unit of claim 10, wherein the second bearing is located outside of the one-way clutch in the radial direction.

12. The motor unit of claim 3, comprising a torque detection unit configured to detect a torque applied to the input shaft in a range in the axial direction and along an outer peripheral surface of the rotary shaft unit, wherein the third bearing is located between the one-way clutch and the torque detection unit in the axial direction.

13. The motor unit of claim 1, further comprising a control board arranged in the case to control the motor, wherein the control board is located between a rotor of the motor and the third bearing in the axial direction.

14. The motor unit of claim 1, further comprising a rotary shaft supporting bearing supporting an end portion, protruding from a stator, of the rotary shaft of the motor, wherein the third bearing is located between the rotary shaft supporting bearing and the stator in the axial direction.

15. The motor unit of claim 1, wherein at least one of the first bearing, the second bearing, or the third bearing is a ball bearing.

16. The motor unit of claim 1, wherein the web is located between the second bearing and the third bearing in the axial direction.

17. The motor unit of claim 1, wherein the input body includes:

a first input body coupled to the input shaft; and a second input body located at a different position in the axial direction from the first input body, fitted into the first input body, and configured to transmit the rotational force to the output body, and a fitting portion in which the first input body and the second input body are fitted into each other is located at a different position in the axial direction from the rim.

18. An electric bicycle comprising the motor unit of claim 1.

* * * * *